United States Patent
Matsuyama

(10) Patent No.: US 6,350,190 B1
(45) Date of Patent: Feb. 26, 2002

(54) TEMPLATE HOLDER, TARGET LENS SHAPE MEASURING DEVICE HAVING THE HOLDER, AND EYEGLASS LENS PROCESSING APPARATUS HAVING THE DEVICE

(75) Inventor: Yoshinori Matsuyama, Aichi (JP)

(73) Assignee: Nidek Co., Ltd., Aichi (JP)

( * ) Notice: Subject to any disclaimer, the term of this patent is extended or adjusted under 35 U.S.C. 154(b) by 0 days.

(21) Appl. No.: 09/561,970

(22) Filed: May 1, 2000

(30) Foreign Application Priority Data

Apr. 30, 1999 (JP) .......................................... 11-125395
May 1, 1999 (JP) .......................................... 11-161498

(51) Int. Cl.[7] ............................................. B24B 41/06
(52) U.S. Cl. ........................ 451/384; 451/526; 451/277
(58) Field of Search ................................. 451/384, 526, 451/277, 42, 59

(56) References Cited

U.S. PATENT DOCUMENTS

| 5,138,770 | A | 8/1992 | Matsuyama | .................... | 33/28 |
|---|---|---|---|---|---|
| 5,228,242 | A | 7/1993 | Matsuyama | .............. | 51/165.74 |
| 5,333,412 | A | 8/1994 | Matsuyama | .............. | 51/165.71 |
| RE35,898 | E | 9/1998 | Shibata et al. | ................. | 451/5 |
| 5,959,199 | A | 9/1999 | Suzuki et al. | ................. | 73/104 |
| 6,006,592 | A | 12/1999 | Suzuki et al. | ................. | 73/104 |

FOREIGN PATENT DOCUMENTS

| EP | 0 881 037 A2 | | 12/1998 | ............. | B24B/9/14 |
|---|---|---|---|---|---|
| JP | 3-20603 | | 1/1991 | ............ | G01B/5/06 |
| JP | 09174405 A | * | 7/1997 | ........... | B24B/09/14 |
| JP | 10-217086 | | 8/1998 | ............. | B24B/9/14 |
| JP | 10-328992 | | 12/1998 | ............. | B24B/9/14 |

* cited by examiner

Primary Examiner—Joseph J. Hail, III
Assistant Examiner—David B. Thomas
(74) Attorney, Agent, or Firm—Sughrue Mion, PLLC

(57) ABSTRACT

A template holder that is used in measurement of a target shape of an eyeglass lens and that attaches at least one of a template and a dummy lens thereon, includes a template attaching portion and a holding arm. The template attaching portion includes: a template placement portion, on which positioning pins to be inserted into small holes of the template are disposed, for placing the template along a measurement plane; a support shaft to be inserted into a central hole of the template, the support shaft being movable relative to the template placement portion to slide the template on and along the measurement plane; an urging mechanism for urging the support shaft to be moved in an urging direction; and a moving mechanism for moving the support shaft in a direction opposite from the urging direction against a urging force of the urging mechanism when the template is to be attached or detached. The holding arm holds the template attaching portion.

14 Claims, 16 Drawing Sheets

TEMPLATE HOLDER, TARGET LENS SHAPE MEASURING DEVICE HAVING THE HOLDER, AND EYEGLASS LENS PROCESSING APPARATUS HAVING THE DEVICE

BACKGROUND OF THE INVENTION

The present invention relates to a target lens shape measuring device for measuring a target lens shape using an eyeglasses frame, a template, etc., and also relates to a template holder for fitting a template or a dummy lens at the time of measurement by the target lens shape measuring device and also relates to an eyeglass lens processing apparatus for processing an eyeglass lens based on measured target lens shape.

A typical target lens shape measuring device is disclosed in, for example, U.S. Pat. No. 5,228,242. In this device, an eyeglasses frame is held by a frame holding section, and a feeler is made to abut against a frame groove to measure the target lens shape. This type of device is arranged so as to be able to measure a template or a dummy lens as well, in which case the template or the dummy lens is fixed to a template holder, and the template holder is then mounted on the device to effect measurement.

However, since the template holder is so arranged that the template or the lens is fixed thereto by being screwed, which requires time and trouble and makes the operation troublesome. Further, when the template holder is used jointly for fixing the dummy lens, an adaptor must be additionally prepared to attach a fixing cup secured to the dummy lens onto the template holder. Therefore, management and attachment of the adaptor are time-consuming and troublesome.

Since the mounting of the template holder on the target lens shape measuring device is generally effected by screwing, the operation is troublesome.

SUMMARY OF THE INVENTION

In view of the above-described art, it is an object of the present invention to provide a template holder which makes it possible to speedily effect the fixation of the template or the dummy lens to the template holder without trouble.

Another object of the invention is to provide a target lens shape measuring device in which the mounting of the template holder on the target lens shape measuring device can be performed easily and an eyeglass lens processing apparatus having the device.

The present invention provides the followings:

(1) A template holder that is used in measurement of a target shape of an eyeglass lens and that attaches at least one of a template and a dummy lens thereon, the holder comprising;
  a template attaching portion including:
    a template placement portion, on which positioning pins to be inserted into small holes of the template are disposed, for placing the template along a measurement plane;
    a support shaft to be inserted into a central hole of the template, the support shaft being movable relative to the template placement portion to slide the template on and along the measurement plane;
    urging means for urging the support shaft to be moved in an urging direction; and
    moving means for moving the support shaft in a direction opposite from the urging direction against a urging force of the urging means when the template is to be attached or detached; and
  a holding arm holding the template attaching portion.

(2) The template holder according to (1), further comprising:
  a dummy lens attaching portion including:
    a fixing cup supporting portion having an insertion hole into which a basal end of a fixing cup fixing the dummy lens thereon is to be inserted; and
    a pressing member having a contact surface to be contacted with the basal end of the fixing cup,
  wherein the holding arm holds the dummy lens mounting portion.

(3) The template holder according to (2), wherein the urging means urges the support shaft and the pressing member to move the support shaft and the pressing member in synchronization with each other in the urging direction, and the moving means moves the support shaft and the pressing member in synchronization with each other in the direction opposite from the urging direction against the urging force of the urging means when at least one of the template and the fixing cup is to be attached or detached.

(4) A target lens shape measuring device for measuring a target shape of an eyeglass lens, comprising:
  the template holder of (1); and
  fixing means for attaching and fixing a part of the template holder thereon.

(5) The device according to (4), further comprising:
  a measurement pin movable while being kept in contact with an outer periphery of the template attached to the template holder fixed by the fixing means;
  measuring means for measuring information on radius vector of the template based on an amount of movement of the measurement pin.

(6) An eyeglass lens processing apparatus, provided with the target lens shape measuring device of (5), for processing an eyeglass lens based on obtained information on radius vector, the apparatus comprising:
  lens processing means having a rotatable abrasive wheel, and a lens rotating shaft for holding and rotating the lens; and
  control means for controlling the lens processing means based on the obtained information of the radius vector.

(7) A template holder that is used in measurement of a target shape of an eyeglass lens and that attaches at least one of a template and a dummy lens thereon, the holder comprising:
  a dummy lens attaching portion including:
    a fixing cup supporting portion having an insertion hole into which a basal end of a fixing cup fixing the dummy lens thereon is to be inserted; and
    a pressing member having a contact surface to be contacted with the basal end of the fixing cup;
    urging means for urging the pressing member to be moved in an urging direction; and
    moving means for moving the pressing member in a direction opposite from the urging direction against a urging force of the urging means when the dummy lens is to be attached or detached; and
  a holding arm holing the dummy lens attaching portion.

(8) A target lens shape measuring device for measuring a target shape of an eyeglass lens, comprising:
  the template holder of (7); and
  fixing means for attaching and fixing a part of the template holder thereon.

(9) The device according to (8), further comprising:
a measurement pin movable while being kept in contact with an outer periphery of the dummy lens attached to the template holder fixed by the fixing means;
measuring means for measuring information on radius vector of the dummy lens based on an amount of movement of the measurement pin.

(10) An eyeglass lens processing apparatus, provided with the target lens shape measuring device of (9), for processing an eyeglass lens based on obtained information on radius vector, the apparatus comprising:
lens processing means having a rotatable abrasive wheel, and a lens rotating shaft for holding and rotating the lens; and
control means for controlling the lens processing means based on the obtained information of the radius vector.

(11) A target lens shape measuring device for measuring a target shape of an eyeglass lens, the device comprising:
a template attaching portion including:
a template placement portion, on which positioning pins to be inserted into small holes of the template are disposed, for placing the template along a measurement plane;
a support shaft to be inserted into a central hole of the template, the support shaft being movable relative to the template placement portion to slide the template on and along the measurement plane;
urging means for urging the support shaft to be moved in an urging direction; and
moving means for moving the support shaft in a direction opposite from the urging direction against a urging force of the urging means when the template is to be attached or detached; and
a holding arm holding the template attaching portion.

(12) The device according to (11), further comprising:
a dummy lens attaching portion including:
a fixing cup supporting portion having an insertion hole into which a basal end of a fixing cup fixing the dummy lens thereon is to be inserted; and
a pressing member having a contact surface to be contacted with the basal end of the fixing cup,
wherein the holding arm holds the dummy lens mounting portion.

(13) The device according to (12), wherein the urging means urges the support shaft and the pressing member to move the support shaft and the pressing member in synchronization with each other in the urging direction, and the moving means moves the support shaft and the pressing member in synchronization with each other in the direction opposite from the urging direction against the urging force of the urging means when at least one of the template and the fixing cup is to be attached or detached.

(14) A target lens shape measuring device for measuring a target shape of an eyeglass lens, the device comprising:
a dummy lens attaching portion including:
a fixing cup supporting portion having an insertion hole into which a basal end of a fixing cup fixing the dummy lens thereon is to be inserted; and
a pressing member having a contact surface to be contacted with the basal end of the fixing cup;
urging means for urging the pressing member to be moved in an urging direction; and
moving means for moving the pressing member in a direction opposite from the urging direction against a urging force of the urging means when the dummy lens is to be attached or detached; and
a holding arm holing the dummy lens attaching portion.

The present disclosure relates to the subject matter contained in Japanese patent application Nos. Hei. 11-125395 (filed on Apr. 30, 1999) and Hei. 11-161498 (filed on May. 1, 1999), which are expressly incorporated herein by reference in their entireties.

DESCRIPTION OF THE PREFERRED EMBODIMENT

Hereafter, a description will be given of an embodiment of the invention.

(1) Overall Construction

Figure 1:
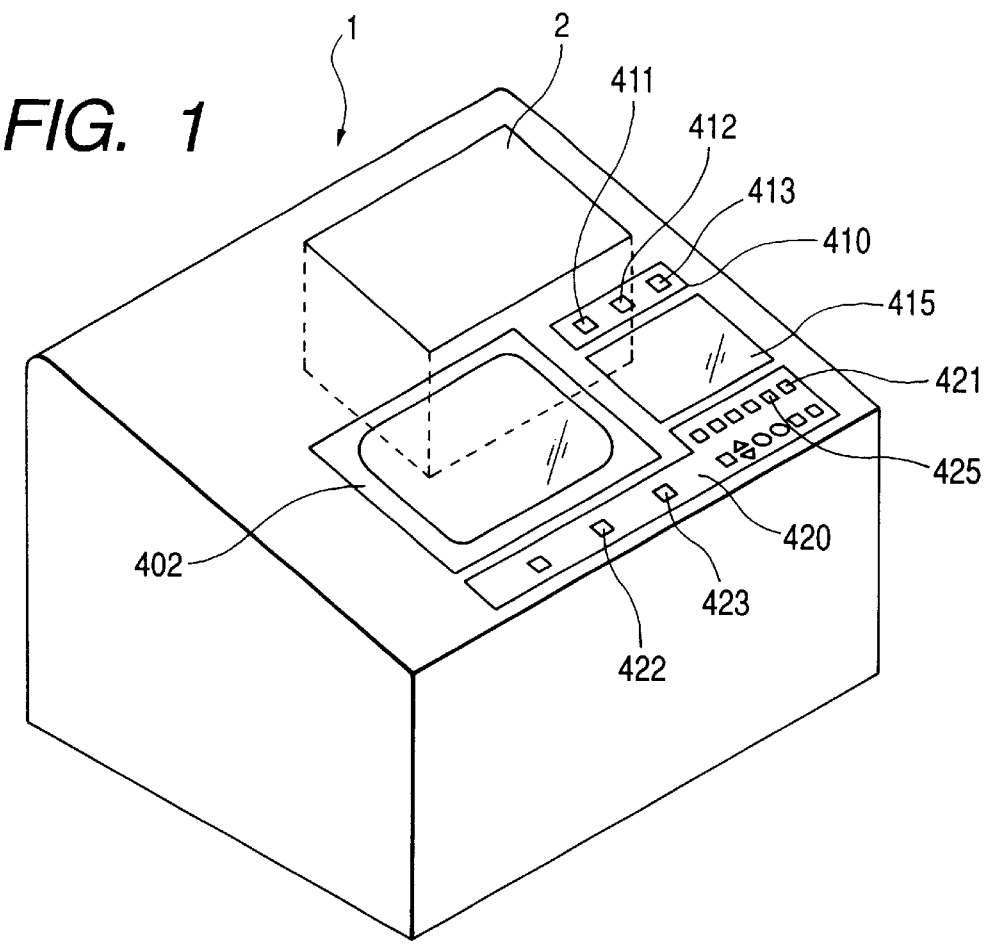
FIG. 1 is a diagram illustrating the external configuration of an eyeglass-lens processing apparatus in accordance with the invention.

FIG. 1 is a diagram illustrating the external configuration of an eyeglass-lens processing apparatus in accordance with the invention. An eyeglass-frame-shape measuring device 2 is incorporated in an upper right-hand rear portion of a main body 1 of the apparatus. The frame-shape measuring device 2 is disposed in such a manner as to be inclined toward a front side along the inclination of the upper surface of the casing of the main body 1 so as to facilitate the setting of an eyeglass frame on a frame holding section 200 which will be described later. A switch panel section 410 having switches for operating the frame-shape measuring device 2 and a display 415 for displaying processing information and the like are disposed in front of the frame-shape measuring device 2. Further, reference numeral 420 denotes a switch panel section having various switches for inputting processing conditions and the like and for giving instructions for processing, and numeral 402 denotes an openable window for a processing chamber.

Figure 2:
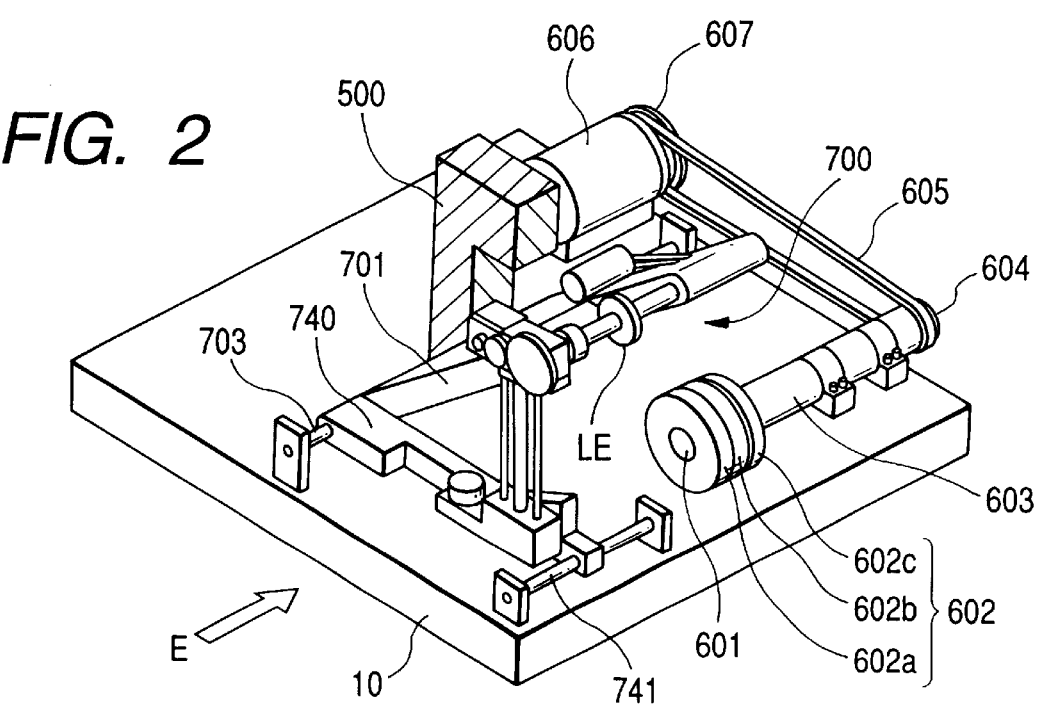
FIG. 2 is a perspective view illustrating the arrangement of a lens processing section disposed in a casing of a main body of the apparatus.

FIG. 2 is a perspective view illustrating the arrangement of a lens processing section disposed in the casing of the main body 1. A carriage unit 700 is mounted on a base 10, and a subject lens LE clamped by a pair of lens chuck shafts of a carriage 701 is ground by a group of abrasive wheels 602 attached to a rotating shaft 601. The group of abrasive wheels 602 include a rough abrasive wheel 602a for glass lenses, a rough abrasive wheel 602b for plastic lenses, and a finishing abrasive wheel 602c for beveling processing and flat processing. The rotating shaft 601 is rotatably attached to the base 10 by a spindle 603. A pulley 604 is attached to an end of the rotating shaft 601, and is linked through a belt 605 to a pulley 607 which is attached to a rotating shaft of an abrasive-wheel rotating motor 606.

A lens-shape measuring section 500 is provided in the rear of the carriage 701.

(2) Construction of Various Sections (A) Eyeglass-Frame-Shape Measuring Device

A description will be given of the major configuration of the frame-shape measuring device 2 by dividing it into the frame holding section, a measuring section, and a template holder.

<Frame Holding Section>

Figure 3:
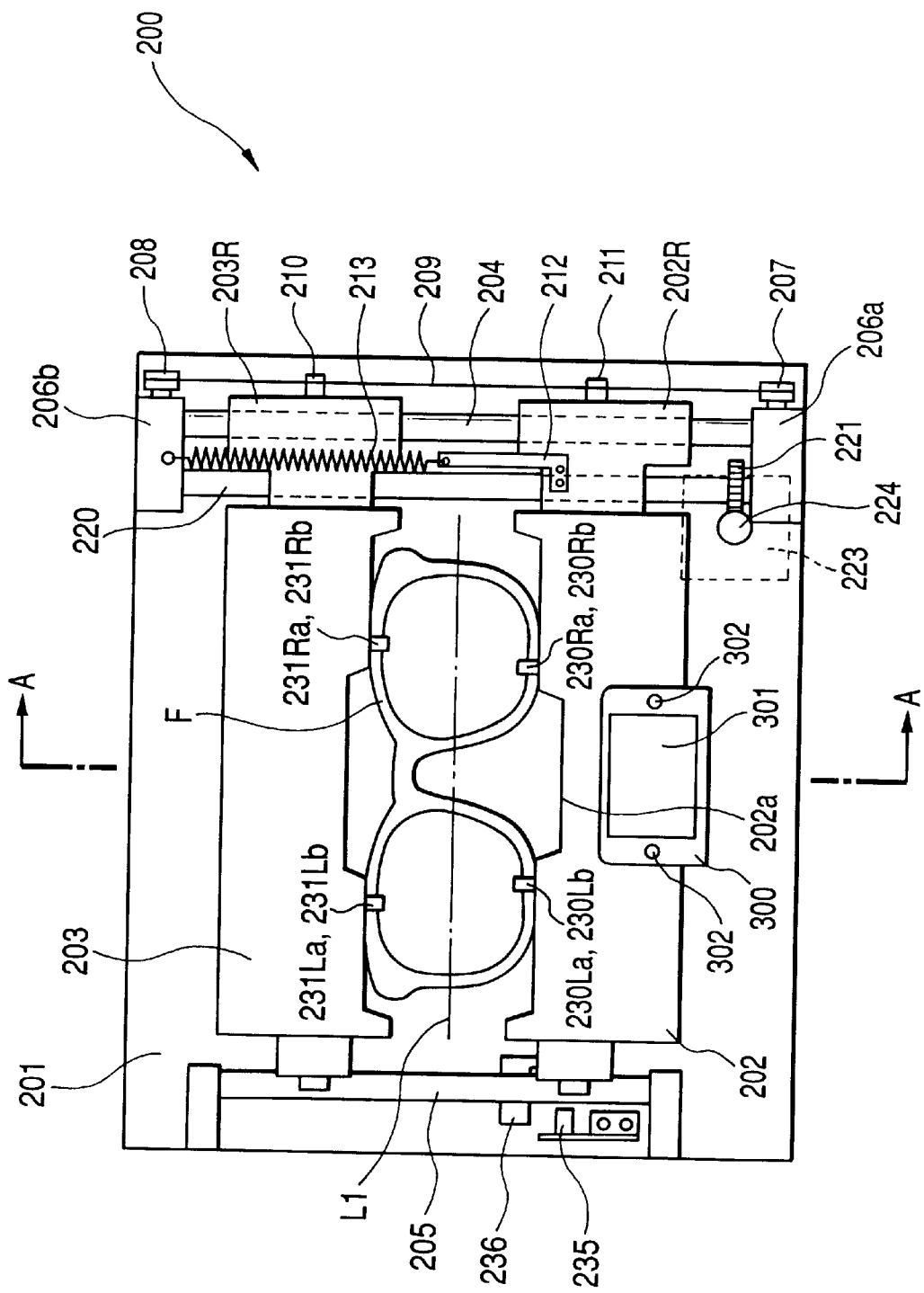
FIG. 3 is a plan view of a frame holding section of an eyeglass-frame-shape measuring device.
Figure 4:
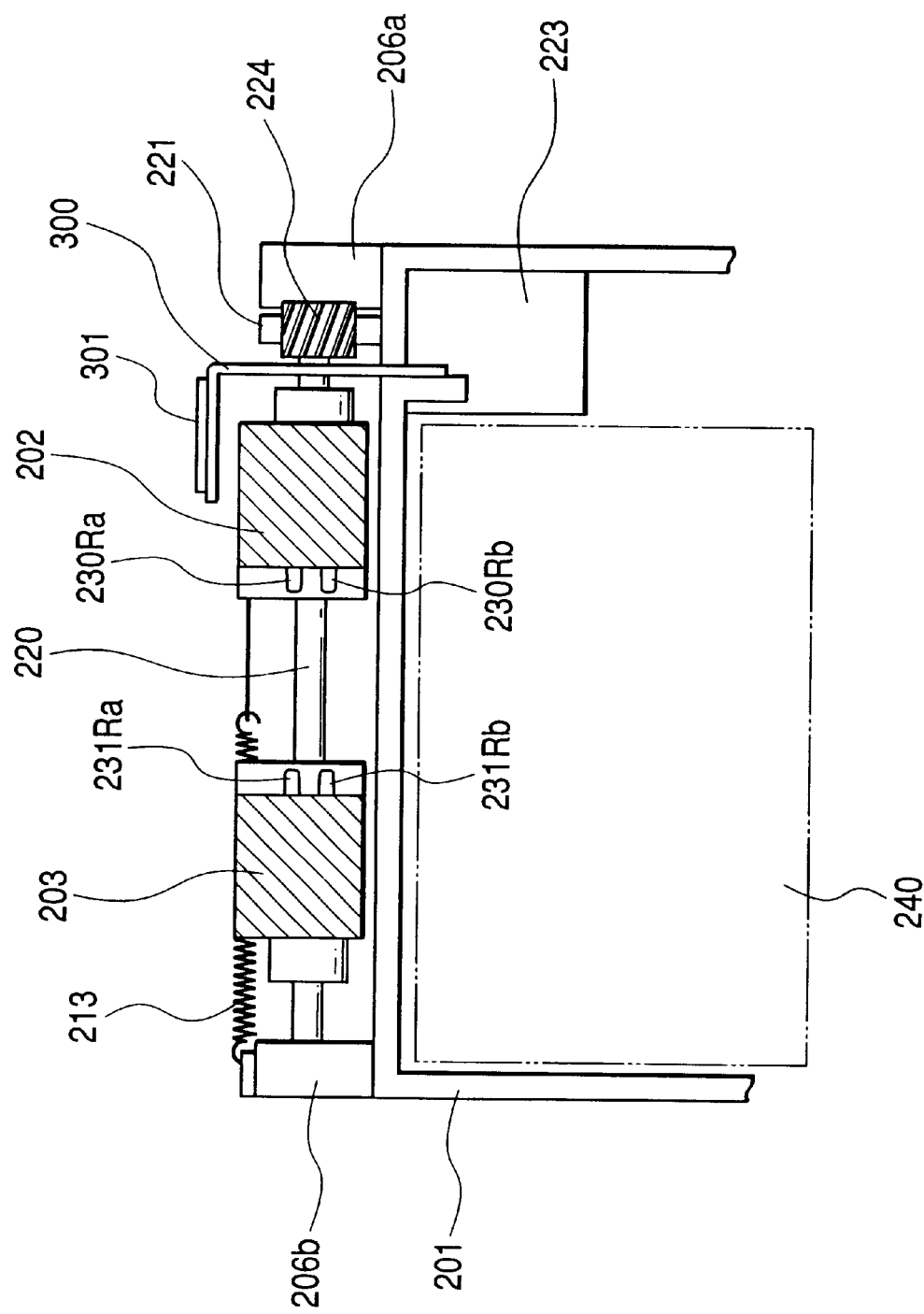
FIG. 4 is a cross-sectional view taken along line A—A in FIG. 3 and illustrating an essential portion.

Referring to FIGS. 3 and 4, a description will be given of the construction of the frame holding section 200. FIG. 3 is a plan view of the frame holding section 200, and FIG. 4 is a cross-sectional view taken along line A—A in FIG. 3 and illustrating an essential portion.

A front slider 202 and a rear slider 203 for holding an eyeglass frame F are slidably placed on a pair of guide rails 204 and 205 arranged on the right- and left-hand sides of a holding section base 201. Pulleys 207 and 208 are rotatably attached respectively to a front-side block 206a and a rear-side block 206b that support the guide rail 204. An endless wire 209 is suspended on the pulleys 207 and 208. An upper side of the wire 209 is secured to a pin 210 attached to a right end member 203R extending from the rear slider 203, while a lower side of the wire 209 is secured to a pin 211 attached to a right end member 202R extending from the front slider 202. Further, a spring 213 is stretched between the rear-side block 206b and the right end member 202R using a mounting plate 212, so that the front slider 202 is constantly urged in the direction in which the spring 213 contracts. Owing to this arrangement, the front slider 202 and the rear slider 203 are slid in a symmetrically opposing manner with respect to a reference line L1 at the center therebtween, and are constantly pulled in directions toward that center (reference line L1) by the spring 213. Accordingly, if one of the front slider 202 and the rear slider 203 is slid in the opening direction, a distance therebetween for holding the frame F can be secured, and if the front slider 202 and the rear slider 203 are in a free state, the distance therebetween is reduced by the urging force of the spring 213.

The frame F is clamped by clamp pins arranged at four locations, i.e. right and left sides of the front slider 202 and right and left sides of the rear slider 203, so as to be held in a reference plane for measurement. Namely, arranged on the front slider 202 are clamp pins 230Ra and 230Rb for clamping a right frame rim of the frame F vertically as well as clamp pins 230La and 230Lb for clamping a left frame rim of the frame F vertically, and these clamp pins are held inside the front slider 202 so as to be opened and closed symmetrically about the measurement reference plane, respectively. Similarly, arranged on the rear slider 203 are clamp pins 231Ra and 231Rb for clamping the right frame rim of the frame F vertically as well as clamp pins 231La and 231Lb for clamping the left frame rim of the frame F vertically, and these clamp pins are held inside the rear slider 203 so as to be opened and closed symmetrically about the measurement reference plane, respectively.

The opening and closing of these clamp pins are effected by driving a clamp motor 223 which is fixed on the reverse side of the holding section base 201. A worm gear 224 attached to a rotating shaft of the motor 223 is in mesh with a wheel gear 221 of a shaft 220 which is rotatably held between the block 206a and the block 206b, so that the rotation of the motor 223 is transmitted to the shaft 220. The shaft 220 is passed through the right end member 202R and the right end member 203R. Inside the right end member 202R, an unillustrated wire for opening and closing the clamp pins 230Ra, 230Rb, 230La, and 230Lb is attached to the shaft 220, and as the wire is pulled by the rotation of the shaft 220, the opening and closing operation of the clamp pins 230Ra, 230Rb, 230La, and 230Lb are effected simultaneously. Inside the right end member 203R as well, an unillustrated similar wire is also attached to the shaft 220, and the opening and closing operation of the clamp pins 231Ra, 231Rb, 231La, and 231Lb are effected simultaneously by the rotation of the shaft 220. Further, brake pads for securing the opening and closing of the front slider 202 and the rear slider 203 due to the rotation of the shaft 220 are respectively provided inside the right end member 202R and the right end member 203R. As the arrangement of the mechanism for opening and closing the clamp pins, it is possible to use the arrangement disclosed in U.S. Pat. No. 5,228,242 commonly assigned to the present assignee, so that reference is had to made thereto for details.

Further, an attaching plate 300 for attaching a template holder 310 (see FIG. 8), which is used at the time of measuring a template or a dummy lens, is fixed at the center on the front side of the holding section base 201. As shown in FIG. 4, the attaching plate 300 has an inverse L-shaped cross section, and the template holder 310 is used upon being placed on the upper surface of the attaching plate 300. A magnet 301 is provided in the center of the upper surface of the attaching plate 300, and two holes 302 for positioning the template holder 310 are formed in the attaching plate 300 on the left- and right-hand sides of the magnet 301.

At the time of measurement using the template holder 310, the template holder 310 is used after the front slider 202 and the rear slider 203 are opened. A sensor 235 for detecting that the front slider 202 has been opened to a measurable state is attached to an upper surface on the left side of the holding section base 201, while a sensor plate 236 is fixed to a left-side end portion of the front slider 202. A measuring section 240 is disposed on the lower side of the holding section base 201.

<Measuring Section>

Figure 5:
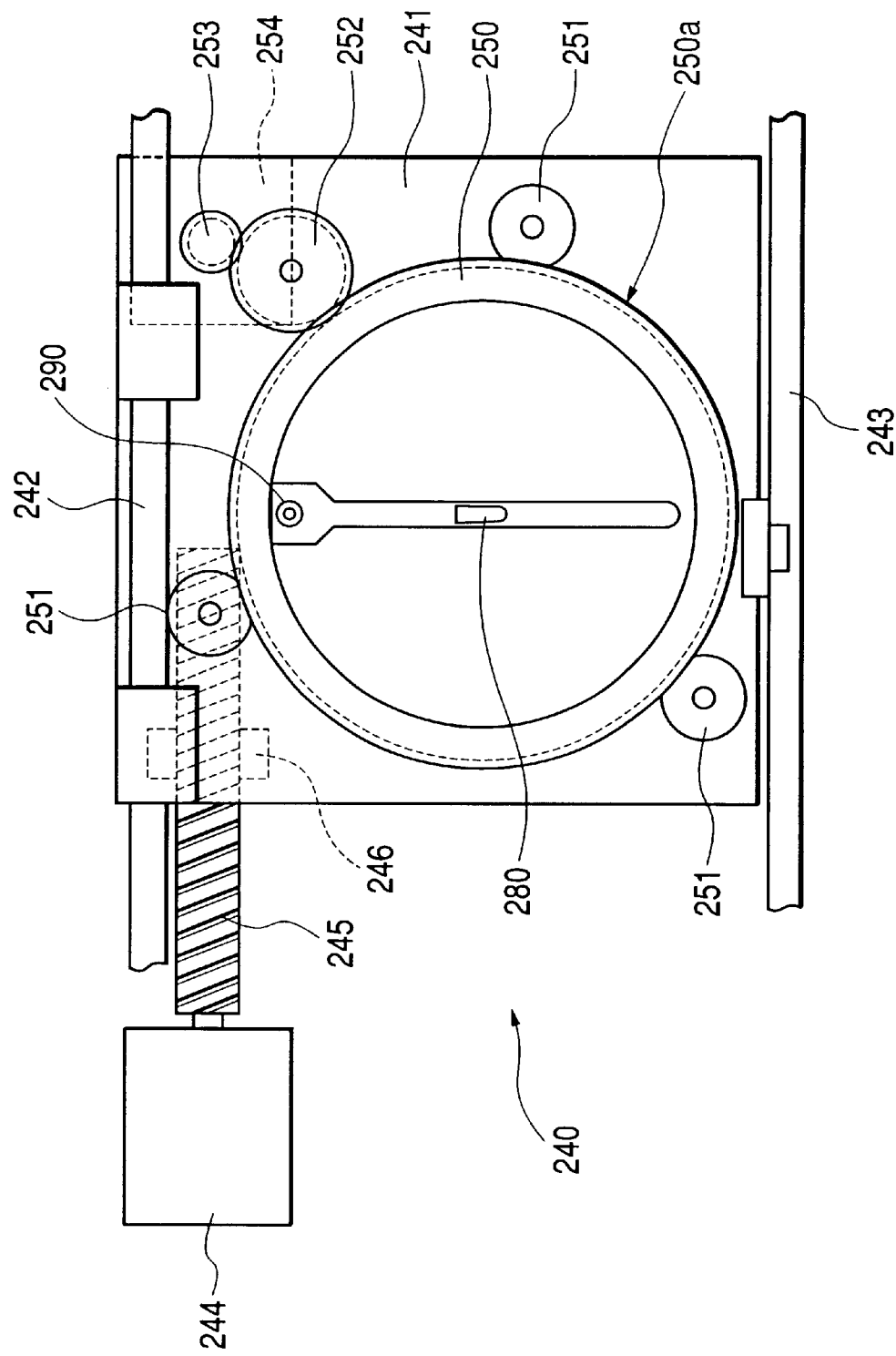
FIG. 5 is a plan view of a measuring section of the eyeglass-frame-shape measuring device.
Figure 6:
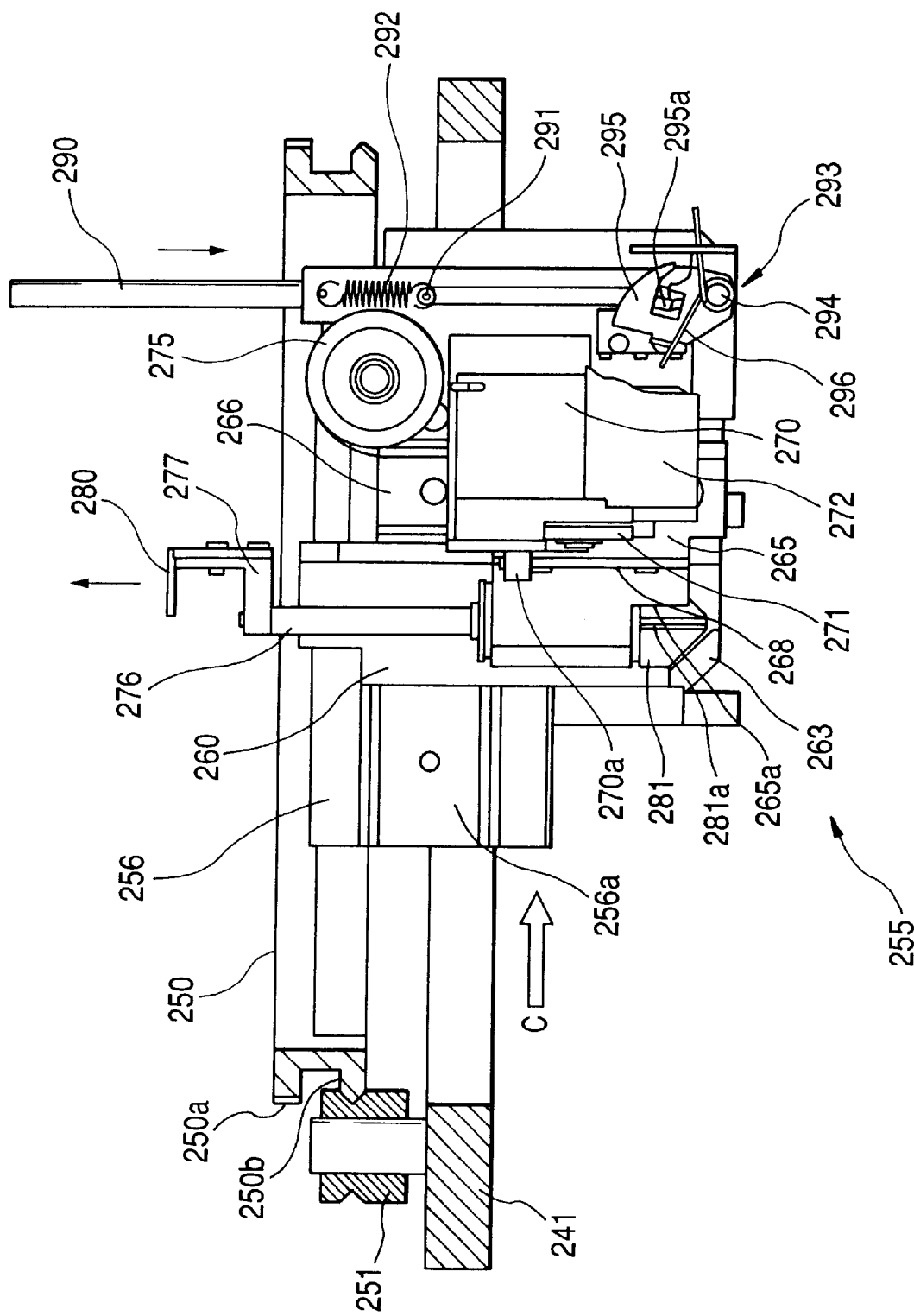
FIG. 6 is a side elevational view for explaining a feeler unit.
Figure 7:
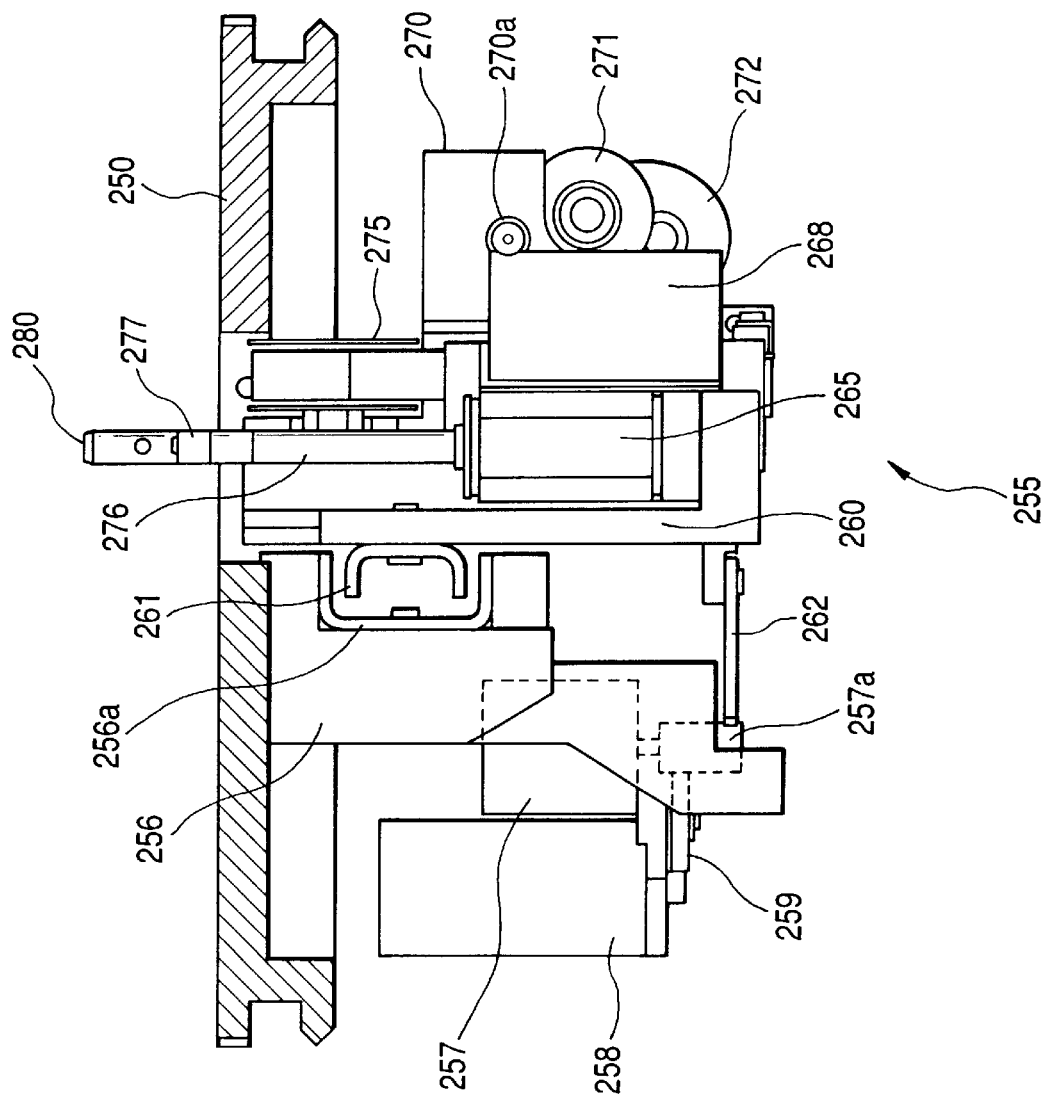
FIG. 7 is a view taken in the direction of arrow C in FIG. 6.

Referring to FIGS. 5 to 7, a description will be given of the construction of the measuring section 240. FIG. 5 is a plan view of the measuring section 240. In FIG. 5, a transversely movable base 241 is supported in such a manner as to be transversely slidable along two rails 242 and 243 which are axially supported by the holding section base 201 and extend in the transverse direction. The transverse movement of the transversely movable base 241 is effected by the driving of a motor 244 attached to the holding section base 201. A ball screw 245 is connected to a rotating shaft of the motor 244, and as the ball screw 245 meshes with an internally threaded member 246 fixed on the lower side of the transversely movable base 241, the transversely movable base 241 is moved in the transverse direction by the forward and reverse rotation of the motor 244.

A rotating base 250 is rotatably held on the transversely movable base 241 by rollers 251 provided at three positions. As shown in FIG. 6, a geared portion 250a is formed around a circumference of the rotating base 250, and an angular or tapered guide rail 250b projecting in a radially outward direction is formed below the geared portion 250a. This guide rail 250b is brought into contact with a V-shaped groove of each roller 251, and the rotating base 250 rotates while being held by the three rollers 251. The geared portion 250a of the rotating base 250 meshes with an idle gear 252, and the idle gear 252 meshes with a gear 253 attached to a rotating shaft of a pulse motor 254 secured to the lower side of the transversely movable base 241. As a result, the rotation of the motor 254 is transmitted to the rotating base 250. A feeler unit 255 is attached to the underside of the rotating base 250.

Referring to FIGS. 6 and 7, a description will be given of the construction of the feeler unit 255. FIG. 6 is a side elevational view for explaining the feeler unit 255, and FIG. 7 is a view taken in the direction of arrow C in FIG. 6.

A fixed block 256 is fixed to the underside of the rotating base 250. A guide rail receiver 256a is attached to a side surface of the fixed block 256 in such a manner as to extend in the planar direction of the rotating base 250. A movable base 260 having a slide rail 261 is slidably attached to the guide rail receiver 256a. A DC motor 257 for moving the movable base 260 and an encoder 258 for detecting the amount of its movement are attached to a side of the fixed block 256 which is opposite to its side where the guide rail receiver 256a is attached. A gear 257a attached to a rotating shaft of the motor 257 meshes with a rack 262 fixed to a lower portion of the movable base 260, and the movable base 260 is moved in the left-and-right direction in FIG. 6 by the rotation of the motor 257. Further, the rotation of the gear 257a attached to the rotating shaft of the motor 257 is transmitted to the encoder 258 through an idle gear 259, and the amount of movement of the movable base 260 is detected from this amount of rotation.

A vertically supporting base 265 is vertically movably supported by the movable base 260. As for its moving mechanism, in the same way as the movable base 260, a slide rail (not shown) attached to the vertically supporting base 265 is slidably held on a guide rail receiver 266 attached to the movable base 260 and extending in the vertical direction. A vertically extending rack 268 is secured to the vertically supporting base 265, a gear 270a of a DC motor 270 attached to the movable base 260 by means of a fixing metal plate meshes with the rack 268, and as the motor 270 rotates, the vertically supporting base 265 is moved vertically. Further, the rotation of the motor 270 is transmitted through an idle gear 271 to an encoder 272 attached to the movable base 260 by means of a fixing metal plate, and the encoder 272 detects the amount of movement of the vertically supporting base 265. Incidentally, a downward load of the vertically supporting base 265 is reduced by a power spring 275 attached to the movable base 260, thereby rendering the vertical movement of the vertically supporting base 265 smooth.

Further, a shaft 276 is rotatably held on the vertically supporting base 265, an L-shaped attaching member 277 is provided at its upper end, and a feeler 280 is fixed to an upper portion of the attaching member 277. The tip of the feeler 280 is aligned with a rotational axis of the shaft 276, and the tip of the feeler 280 is to be brought into contact with a frame groove of the frame F.

A limiting member 281 is attached to a lower end of the shaft 276. This limiting member 281 has a substantially hollow cylindrical shape, and a protrusion 281a is formed on its side surface along the vertical direction, while another protrusion 281a is formed on the opposite side opposite with respect to the paper surface of FIG. 6. As these two protrusions 281a respectively abut against notched surfaces 265a (the illustrated notched surface 265a, and a similar notched surface 265a that is provided on the opposite side with respect to the paper surface of FIG. 6) formed in the vertically supporting base 265, the rotation of the shaft 276 (i.e., the rotation of the feeler 280) is limited to a certain range. An obliquely cut slanting surface is formed on a lower portion of the limiting member 281. When the limiting member 281 is lowered together with the shaft 276 due to the downward movement of the vertically supporting base 265, this slanting surface abuts against a slanting surface of a block 263 secured to the movable base 260. As a result, the rotation of the limiting member 281 is guided to the state shown in FIG. 6, thereby correcting the orientation of the tip of the feeler 280.

In FIG. 6, a measuring shaft 290 for template measurement is vertically slidably held on a right-hand side portion of the movable base 260. A pin 291 extending toward the paper surface as viewed in FIG. 6 is attached to a lower end of the measuring shaft 290, and a spring 292 is stretched between this pin 291 and an upper portion of the movable base 260, thereby constantly urging the measuring shaft 290 in the upward direction. The pin 291 is provided with a lock mechanism 293. The lock mechanism 293 has a fixing plate 295 which rotates about a shaft 294 as well as a coil spring 296 which urges the fixing plate 295 in the rightward direction in FIG. 6. If the measuring shaft 290 is pushed into the interior of the movable base 260 against the urging force of the spring 292, the pin 291 rotates the fixing plate 295 in the leftward direction in FIG. 6 while abutting against the fixing plate 295. Further, if the measuring shaft 290 is pushed in, the pin 291 is located below the fixing plate 295, and the fixing plate 295 is returned to the right side by the urging force of the coil spring 296. As a result, the pin 291 enters below a notched portion of the fixing plate 295, and the measuring shaft 290 is locked in a state of being accommodated inside the movable base 260. At the time of extracting the measuring shaft 290, the pushing in of the top portion of the measuring shaft 290 causes the pin 291 to be disengaged from the notched portion while being guided by a guide plate 295a formed on the fixing plate 295, and the measuring shaft 290 is raised to an upper predetermined position by the urging force of the spring 292.

<Template Holder>

Figure 8:
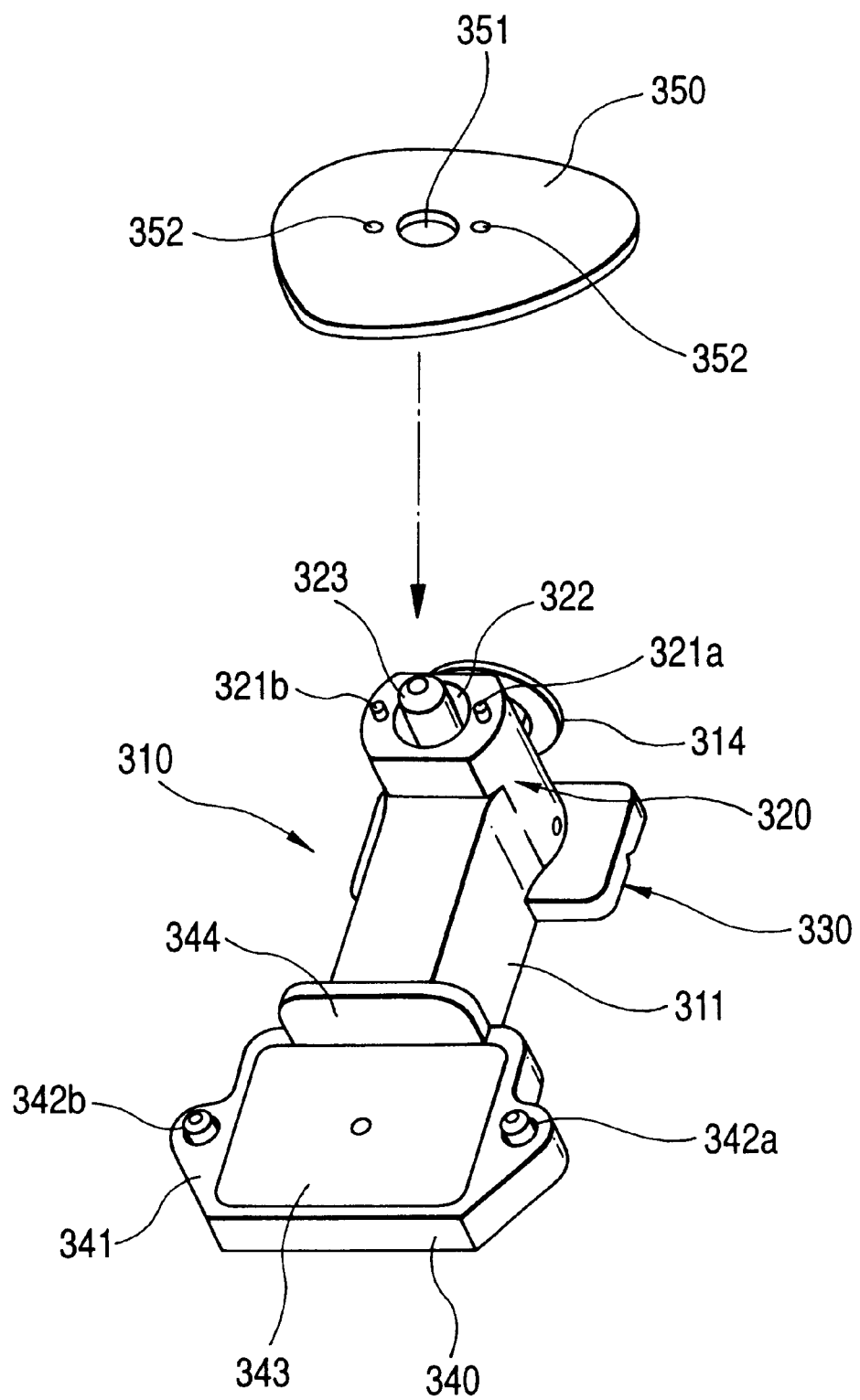
FIG. 8 is a perspective view of a template holder in a state in which a template holding portion for mounting a template thereon is oriented upward.
Figure 9:
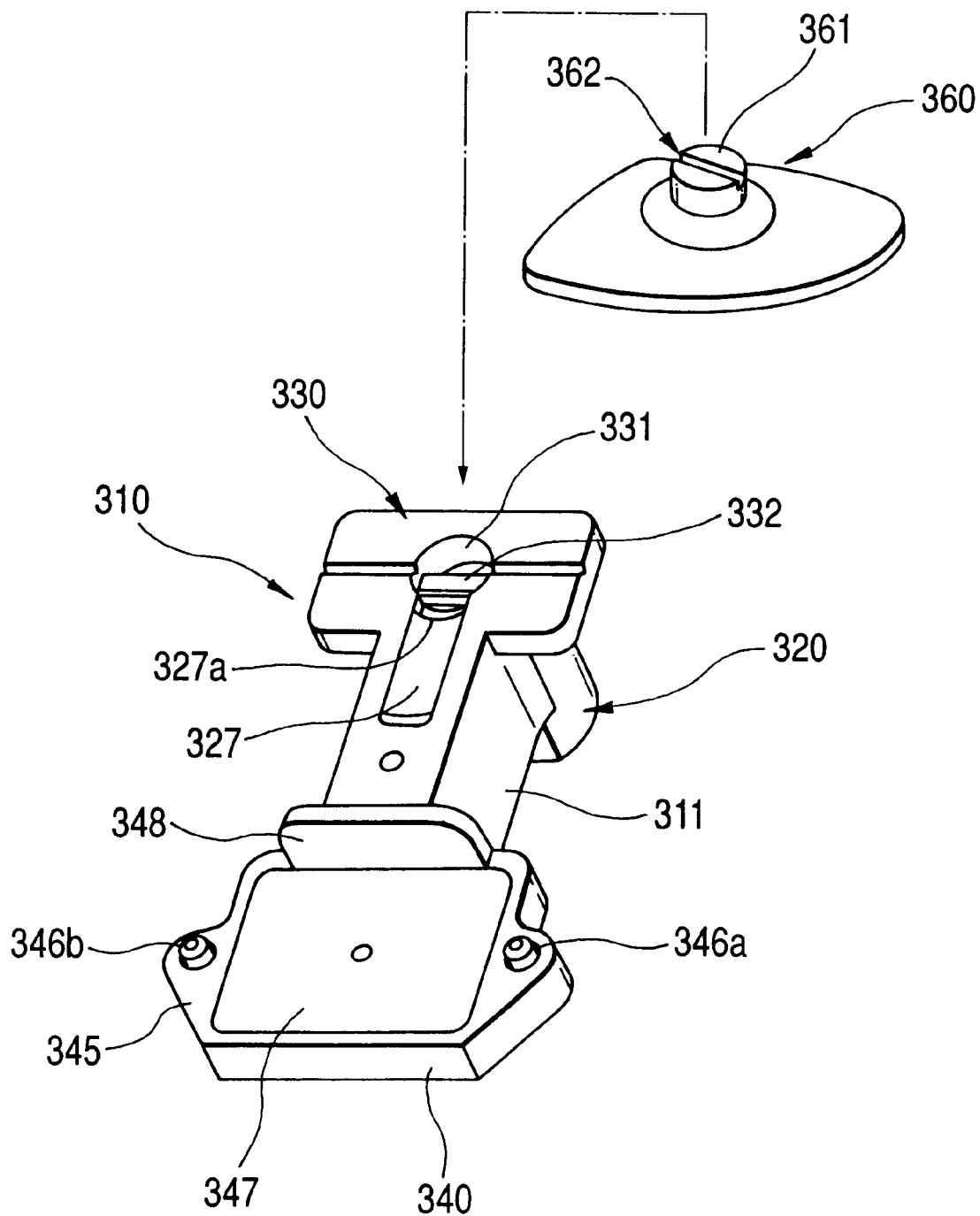
FIG. 9 is a perspective view of the template holder in a state in which a cup holding portion for mounting a dummy lens thereon is oriented upward.
Figure 10:
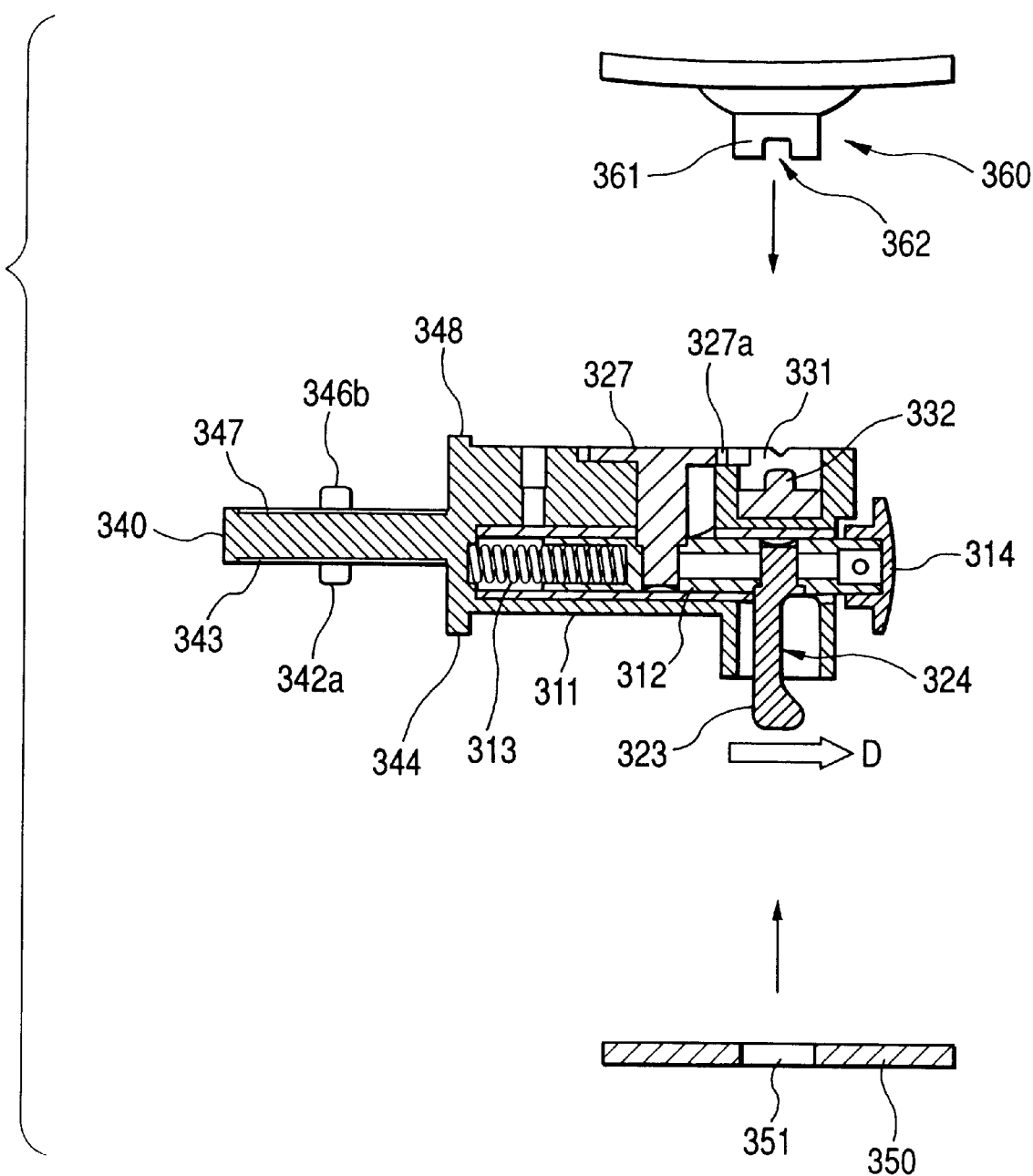
FIG. 10 is a longitudinal cross-sectional view of the template holder.

Referring to FIGS. 8 to 10, a description will be given of the construction of the template holder 310. FIG. 8 is a perspective view of the template holder 310 in a state in which a template holding portion 320 for mounting a template 350 thereon is oriented upward. FIG. 9 is a perspective view of the template holder 310 in a state in which a cup holding portion 330 for mounting a dummy lens thereon is oriented upward. FIG. 10 is a longitudinal cross-sectional view of the template holder 310.

The template holding portion 320 and the cup holding portion 330 are provided integrally on opposite surfaces, respectively, of a main body block 311 of the template holder 310 so that the template holding portion 320 and the cup holding portion 330 can be selectively used by inverting the template holder 310. Pins 321a and 321b are implanted on the template holding portion 320, an opening 322 is provided in the center, and a movable pin 323 projects from the opening 322. As shown in FIG. 10, the movable pin 323 is fixed to a movable shaft 312 inserted in the main body block 311, and the movable shaft 312 is constantly urged in the direction of arrow D in FIG. 10 by a spring 313. A button 314 for performing a pushing operating is attached to a distal end of the movable shaft 312 projecting from the main body block 311. Further, a recessed portion 324 is formed on the front side (right-hand side in FIG. 10) of the movable pin 323.

A hole 331 for inserting a basal part 361 of a cup 360 with a dummy lens fixed thereon is formed in the cup holding portion 330, and a projection 332 for fitting to a key groove 362 formed in the basal part 361 is formed inside the hole 331. Further, a sliding member 327 is fixed to the movable shaft 312 inserted in the main body block 311, and its front-side end face 327a is circular-arc shaped (a circular arc of the same diameter as that of the hole 331).

At the time of fixing the template 350, after the button 314 is manually pushed in, the template 350 is positioned such that a central hole 351 is fitted over the movable pin 323 while two small holes 352 provided on both sides of the central hole 351 are engaged with the pins 321a and 321b. Subsequently, if the button 314 pushed in toward the main body block 311 side is released, the movable pin 323 is returned in the direction of arrow D by the urging force of the spring 313, and its recessed portion 324 abuts against the wall of the central hole 351 in the template 350, thereby fixing the template 350.

At the time of fixing the cup 360 attached to the dummy lens, in the same way as with the template, after the button 314 is manually pushed in to open the sliding member 327, the basal part 361 of the cup 360 is inserted into the hole 331 such that the key groove 362 of the basal part 361 is fitted to the projection 332, Upon releasing the button 314, the sliding member 327 together with the movable shaft 312 is returned toward the hole 331 by the urging force of the spring 313. As the basal part 361 of the cup 360 inserted in the hole 331 is pressed by the circular-arc shaped end face 327a, the cup 360 is fixed in the cup holding portion 330.

A fitting portion 340 for fitting the template holder 310 to the attaching plate 300 of the holding section base 201 is provided on the rear side of the main body block 311, and its obverse side (the template holding portion 320 side is assumed to be the obverse side) has the same configuration as the reverse side. Pins 342a, 342b and 346a, 346b for insertion into the two holes 302 formed in the upper surface of the attaching plate 300 are respectively implanted on the obverse surface 341 and the reverse surface 345 of the fitting portion 340. Further, iron plates 343 and 347 are respectively embedded in the obverse surface 341 and the reverse surface 345. Flanges 344 and 348 are respectively formed on the obverse surface 341 and the reverse surface 345 of the fitting portion 340.

At the time of attaching the template holder 310 to the frame-shape measuring device 2, after the front slider 202 is opened toward the front side (the rear slider 203 is also opened simultaneously), in the case of measuring the dummy lens, the template holding portion 320 side is oriented downward, and the pins 342a and 342b on the fitting portion 340 are engaged in the holes 302 in the attaching plate 300. At this time, since the iron plate 343 is attracted by the magnet 301 provided on the upper surface of the attaching plate 300, the template holder 310 can be easily fixed immovaly to the upper surface of the attaching plate 300. Further, the flange 344 of the template holder 310 abuts against a recessed surface 202a formed in the center of the front slider 202 to maintain the open state of the front slider 202 and the rear slider 203.

(B) Carriage Section

Figure 11A:
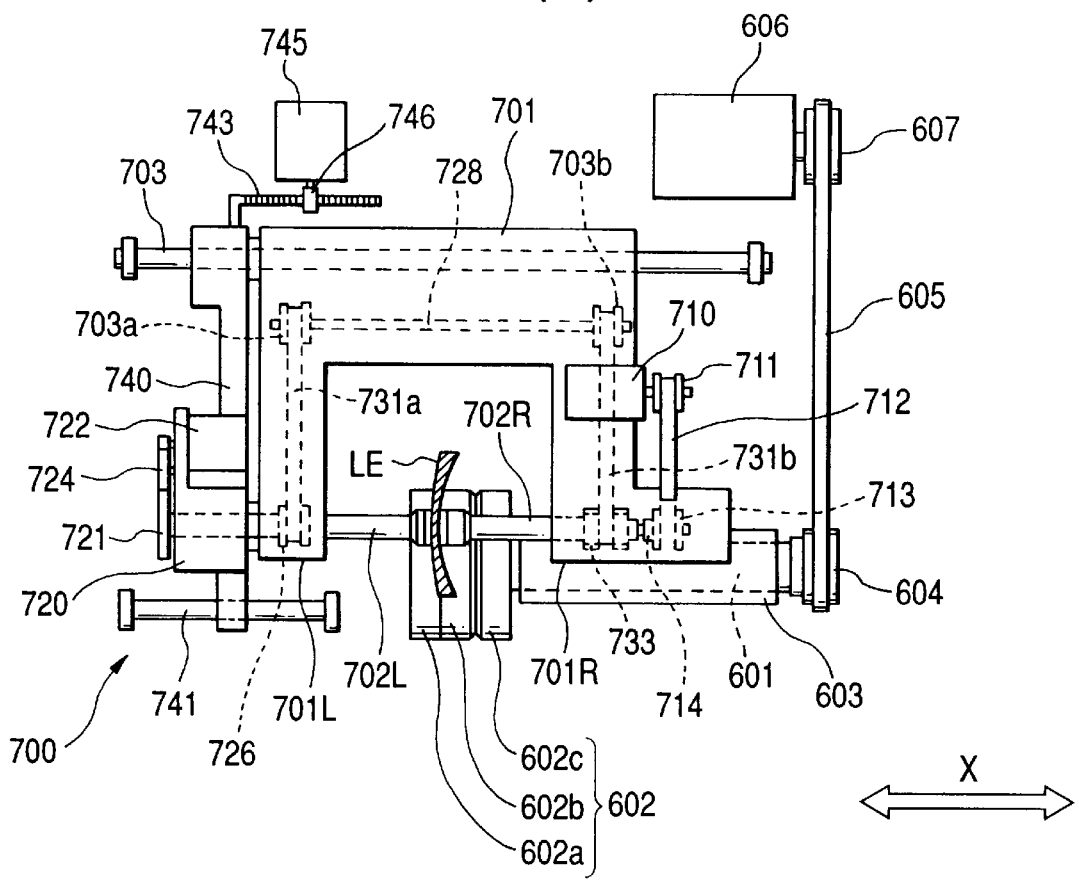
FIG. 11 is a schematic diagram of an essential portion of a carriage section.
Figure 11B:
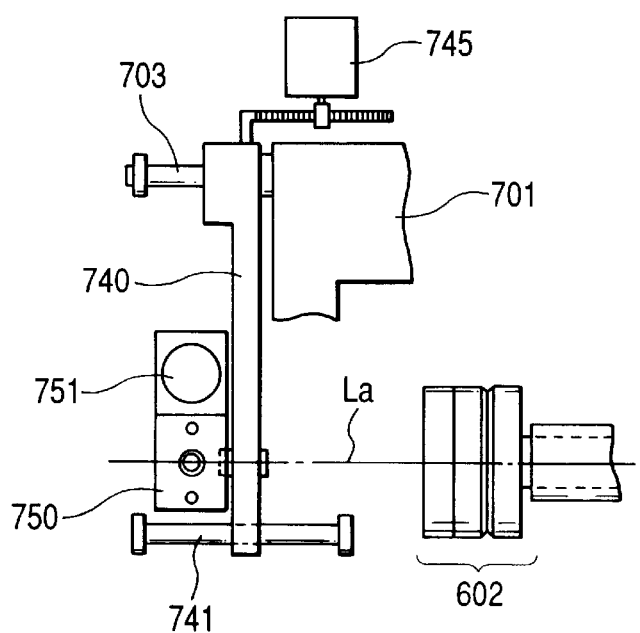
Figure 12:
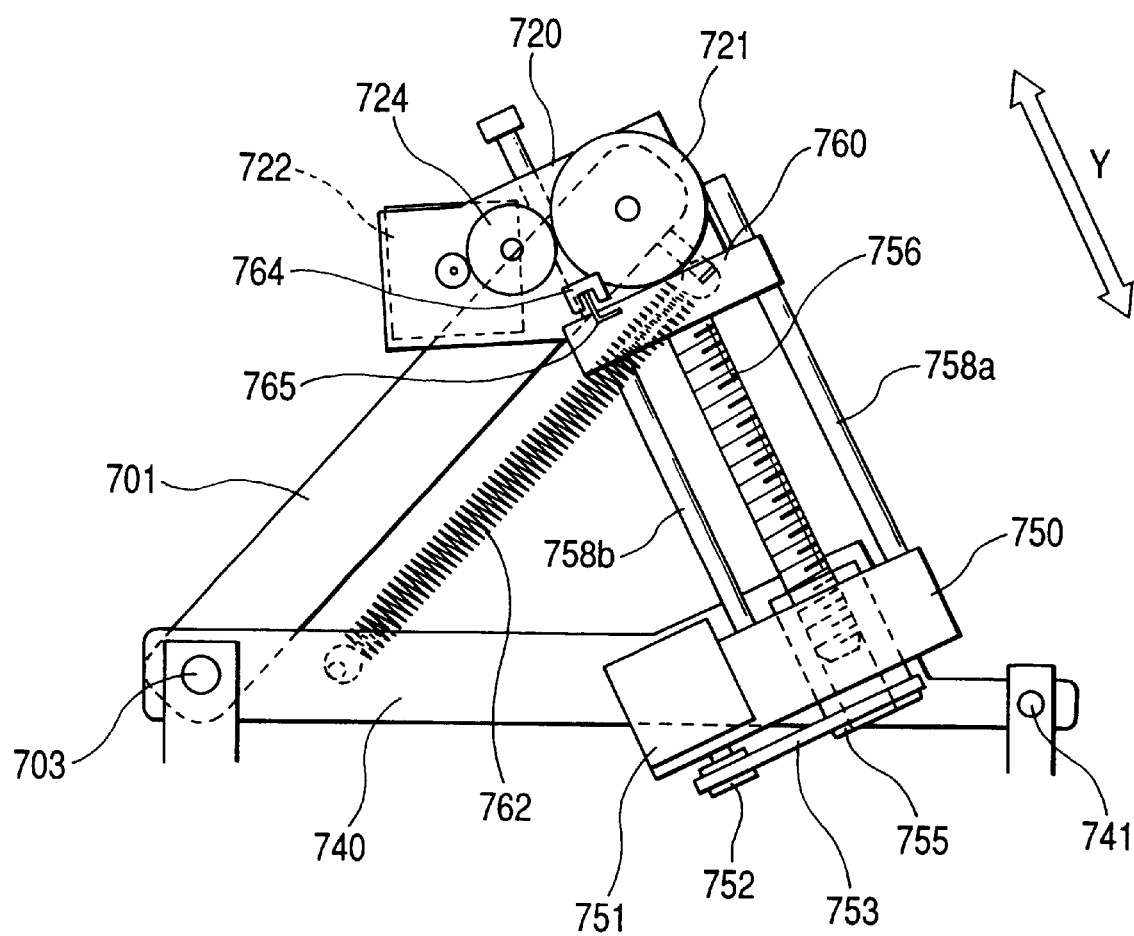
FIG. 12 is a view, taken from the direction of arrow E in FIG. 2, of the carriage section.

Referring to FIGS. 2, 11, and 12, a description will be given of the construction of the carriage section 700. FIG. 11 is a schematic diagram of essential portions of the carriage section 700, and FIG. 12 is a view, taken from the direction of arrow E in FIG. 2, of the carriage section 700.

The carriage 701 is capable of rotating the lens LE while chucking it with two lens chuck shafts (lens rotating shafts) 702L and 702R, and is rotatably slidable with respect to a carriage shaft 703 that is fixed to the base 10 and that extends in parallel to the abrasive-wheel rotating shaft 601. Hereafter, a description will be given of a lens chuck mechanism and a lens rotating mechanism as well as an X-axis moving mechanism and a Y-axis moving mechanism of the carriage 701 by assuming that the direction in which the carriage 701 is moved in parallel to the abrasive-wheel rotating shaft 601 is the X axis, and the direction for changing the axis-to-axis distance between the chuck shafts (702L, 702R) and the abrasive-wheel rotating shaft 601 by the rotation of the carriage 701 is the Y axis.

<Lens Chuck Mechanism and Lens Rotating Mechanism>

The chuck shaft 702L and the chuck shaft 702R are rotatably held coaxially by a left arm 701L and a right arm 701R, respectively, of the carriage 701. A chucking motor 710 is fixed to the center of the upper surface of the right arm 701R, and the rotation of a pulley 711 attached to a rotating shaft of the motor 710 rotates a feed screw 713, which is rotatably held inside the right arm 701R, by means of a belt 712. A feed nut 714 is moved in the axial direction by the rotation of the feed screw 713. As a result, the chuck shaft 702R connected to the feed nut 714 can be moved in the axial direction, so that the lend LE is clamped by the chuck shafts 702L and 702R.

A rotatable block 720 for attaching a motor, which is rotatable about the axis of the chuck shaft 702L, is attached to a left-side end portion of the left arm 701L, and the chuck shaft 702L is passed through the block 720, a gear 721 being secured to the left end of the chuck shaft 702L. A motor 722 for lens rotation is fixed to the block 720, and as the motor 722 rotates the gear 721 through a gear 724, the rotation of the motor 720 is transmitted to the chuck shaft 702L. A pulley 726 is attached to the chuck shaft 702L inside the left arm 701L. The pulley 726 is linked by means of a timing belt 731a to a pulley 703a secured to a left end of a rotating shaft 728, which is held rotatably in the rear of the carriage 701. Further, a pulley 703b secured to a right end of the rotating shaft 728 is linked by means of a timing belt 731b to a pulley 733 which is attached to the chuck shaft 702R in such a manner as to be slidable in the axial direction of the chuck shaft 702R inside the right arm 701R of the carriage. By virtue of this arrangement, the chuck shaft 702L and the chuck shaft 702R are rotated synchronously.

<X-axis Moving Mechanism and Y-axis Moving Mechanism of Carriage>

The carriage shaft 703 is provided with a movable arm 740 which is slidable in its axial direction so that the arm 740 is movable in the X-axis direction (in the axial direction of the shaft 703) together with the carriage 701. Further, the arm 740 at its front position is slidable on and along a guide shaft 741 that is secured to the base 10 in a parallel positional relation to the shaft 703. A rack 743 extending in parallel to the shaft 703 is attached to a rear portion of the arm 740, and this rack 743 meshes with a pinion 746 attached to a rotating shaft of a motor 745 for moving the carriage in the X-axis direction, the motor 745 being secured to the base 10. By virtue of the above-described arrangement, the motor 745 is able to move the carriage 701 together with the arm 740 in the axial direction of the shaft 703 (in the X-axis direction).

As shown in FIG. 11 (b), a swingable block 750 is attached to the arm 740 in such a manner as to be rotatable about the axis La which is in alignment with the rotational center of the abrasive wheels 602. The distance from the center of the shaft 703 to the axis La and the distance from the center of the shaft 703 to the rotational center of the chuck shaft (702L, 702R) are set to be identical. A Y-axis moving motor 751 is attached to the swingable block 750, and the rotation of the motor 751 is transmitted by means of a pulley 752 and a belt 753 to a female screw 755 held rotatably in the swingable block 750 as shown in FIG. 12. A feed screw 756 is inserted in a threaded portion of the female screw 755 in mesh therewith, and the feed screw 756 is moved vertically by the rotation of the female screw 755.

A guide block 760 which abuts against a lower end surface of the motor-attaching block 720 is fixed to an upper end of the feed screw 756, and the guide block 760 moves along two guide shafts 758a and 758b implanted on the swingable block 750. Accordingly, as the guide block 760 is vertically moved together with the feed screw 756 by the rotation of the motor 751, it is possible to change the vertical position of the block 720 abutting against the guide block 760. As a result, the vertical position of the carriage 701 attached to the block 720 can be also changed (namely, the carriage 701 rotates about the shaft 703 to change the axis-to-axis distance between the chuck shafts (702L, 702R) and the abrasive-wheel rotating shaft 601). A spring 762 is stretched between the left arm 701L and the arm 740, so that the carriage 701 is constantly urged downward to impart processing pressure onto the lens LE. Although the downward urging force acts on the carriage 701, the downward movement of the carriage 701 is restricted such that the carriage 701 can only be lowered down to the position in which the block 720 abuts against the guide block 760. A sensor 764 for detecting an end of processing is attached to the block 720, and the sensor 764 detects the end of processing (ground state) by detecting the position of a sensor plate 765 attached to the guide block 760.

(C) Lens-Shape Measuring Section

Figure 13:
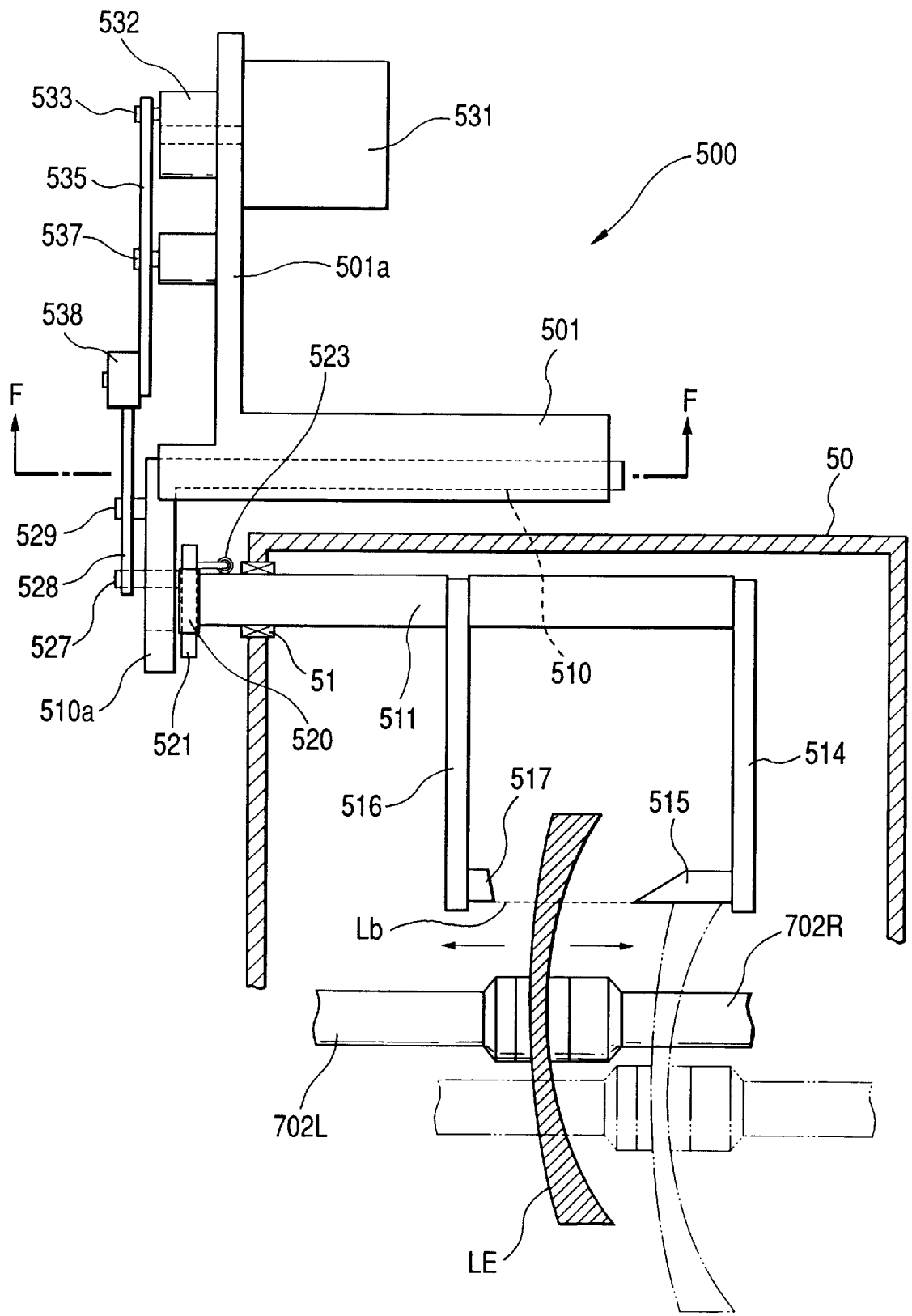
FIG. 13 is a top view of a lens-shape measuring section.
Figure 14:
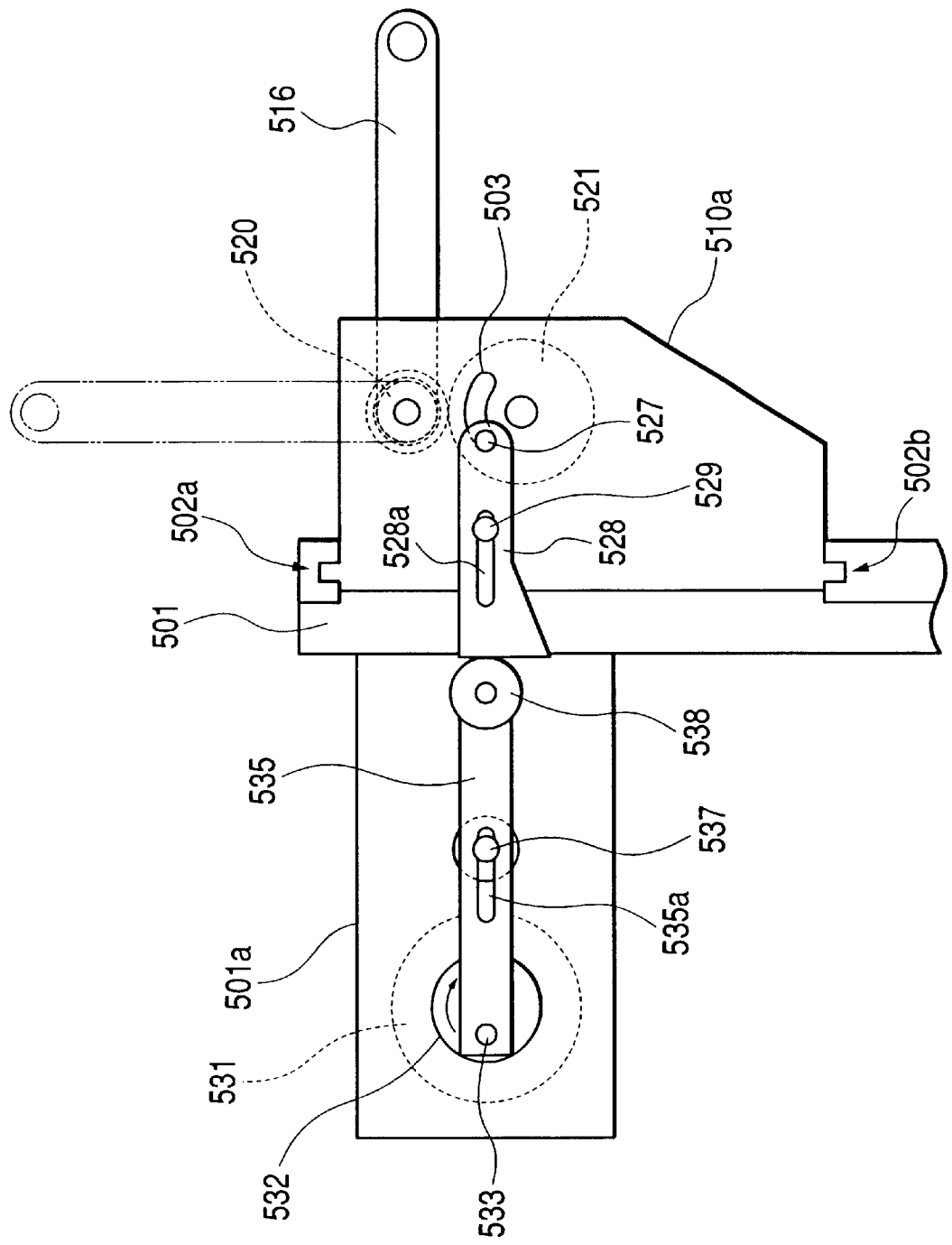
FIG. 14 is a left side elevational view of FIG. 13.
Figure 15:
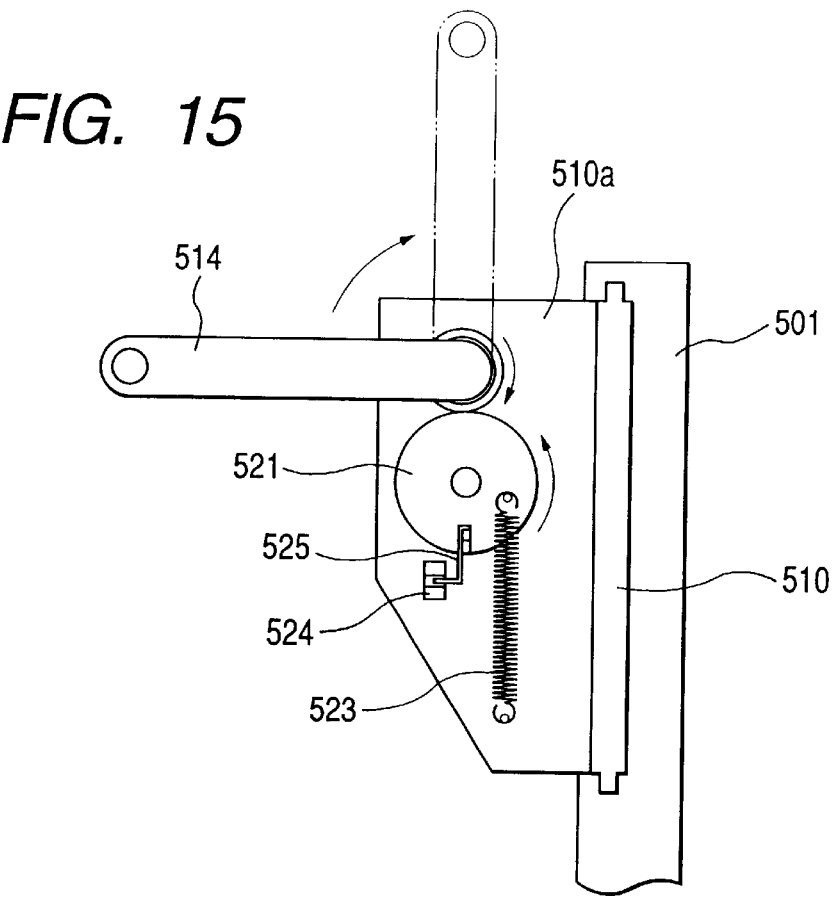
FIG. 15 is a view illustrating an essential portion of the right side surface shown in FIG. 13.
Figure 16:
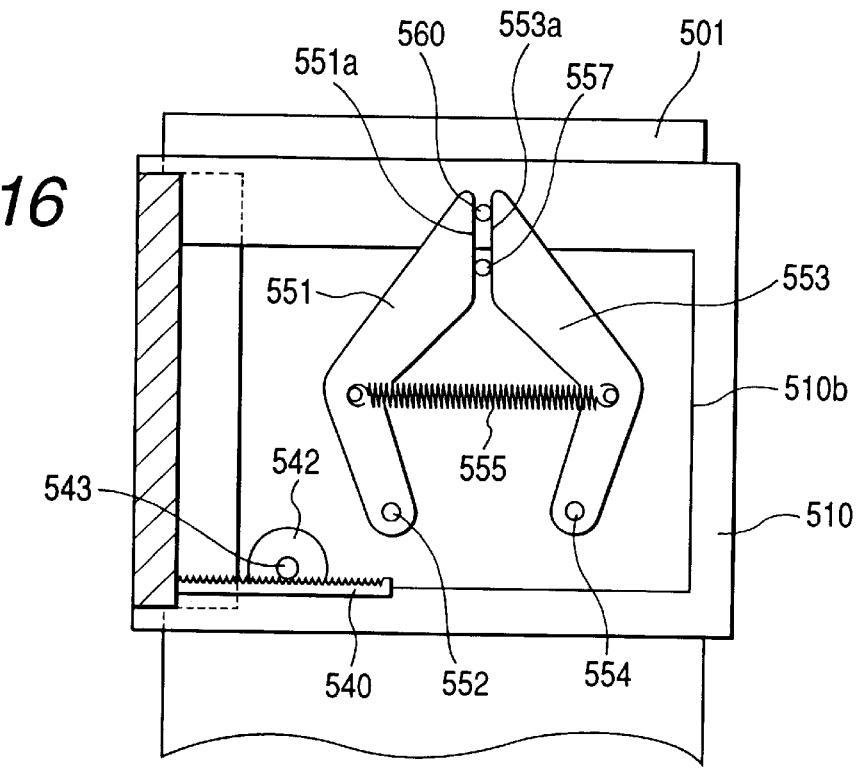
FIG. 16 is a cross-sectional view taken along line F—F in FIG. 13.

Referring to FIGS. 13 to 16, a description will be given of the construction of the lens-shape measuring section 500. FIG. 13 is a top view of the lens-shape measuring section, FIG. 14 is a left side elevational view of FIG. 13, and FIG. 15 is a view illustrating essential portions of the right side surface shown in FIG. 13. FIG. 16 is a cross-sectional view taken along line F—F in FIG. 13.

A supporting block 501 is provided uprightly on the base 10. A sliding base 510 is held on the supporting block 501 in such a manner as to be slidable in the left-and-right direction (in a direction parallel to the chuck shafts) by means of a pair of upper and lower guide rail portions 502a and 502b. A forwardly extending side plate 510a is formed integrally at a left end of the sliding base 510, and a shaft 511 having a parallel positional relation to the chuck shafts 702L and 702R is rotatably attached to the side plate 510a. A feeler arm 514 having a feeler 515 for measuring the lens rear surface is secured to a right end portion of the shaft 511, while a feeler arm 516 having a feeler 517 for measuring the lens front surface is secured to the shaft 511 at a position close to its center. Both the feeler 515 and the feeler 517 have a hollow cylindrical shape, a distal end portion of each of the feelers is obliquely cut as shown in FIG. 13, and the obliquely cut tip comes into contact with the rear surface or front surface of the lens LE. Contact points of the feeler 515 and the feeler 517 are opposed to each other, and the interval therebetween is arranged to be constant. Incidentally, the axis Lb connecting the contact point of the feeler 515 and the contact point of the feeler 517 is in a predetermined parallel positional relation to the axis of the chuck shafts (702L, 702R) in the state measurement shown in FIG. 13. Further, the feeler 515 has a slightly longer hollow cylindrical portion, and measurement is effected by causing its side surface to abut against an edge surface of the lens LE during the measurement of the outside diameter of the lens (which will be described later).

A small gear 520 is fixed to a proximal portion of the shaft 511, and a large gear 521 which is rotatably provided on the side plate 510a is in mesh with the small gear 520. A spring 523 is stretched between the large gear 521 and a lower portion of the side plate 510a, so that the large gear 521 is constantly pulled in the direction of rotating clockwise in FIG. 15 by the spring 523. Namely, the arms 514 and 516 are urged so as to rotate downward by means of the small gear 520.

A slot 503 is formed in the side plate 510a, and a pin 527 which is eccentrically secured to the large gear 521 is passed through the slot 503. A first moving plate 528 for rotating the large gear 521 is attached to the pin 527. An elongated hole 528a is formed substantially in the center of the first moving plate 528, and a fixed pin 529 secured to the side plate 510a is engaged in the elongated hole 528a.

Further, a motor 531 for arm rotation is attached to a rear plate 501a extending in the rear of the supporting block 501, and an eccentric pin 533 at a position eccentric from the rotating shaft is attached to a rotating member 532 provided on a rotating shaft of the motor 531. A second moving plate 535 for moving the first moving plate 528 in the back-and-forth direction (in the left-and-right direction in FIG. 14) is attached to the eccentric pin 533. An elongated hole 535a is formed substantially in the center of the second moving plate 535, and a fixed pin 537 which is fixed to the rear plate 501 is engaged in the elongated hole 535a. A roller 538 is rotatably attached to an end portion of the second moving plate 535.

When the eccentric pin 533 is rotated clockwise from the state shown in FIG. 14 by the rotation of the motor 531, the second moving plate 535 moves forward (rightward in FIG. 14) by being guided by the fixed pin 537 and the elongated hole 535a. Since the roller 538 abuts against the end face of the first moving plate 528, the roller 538 moves the first movig plate 528 in the forward direction as well owing to the movement of the second moving plate 535. As a result of this movement, the first moving plate 528 rotates the large gear 521 by means of the pin 527. The rotation of the large gear 521, in turn, causes the feeler arms 514 and 516 attached to the shaft 511 to retreat to an upright state. The driving by the motor 531 to this retreated position is determined as an unillustrated micro switch detects the rotated position of the rotating member 532.

If the motor 531 is reversely rotated, the second moving plate 535 is pulled back, the large gear 521 is rotated by being pulled by the spring 523, and the feeler arms 514 and 516 are inclined toward the front side. The rotation of the large gear 521 is limited as the pin 527 comes into contact with an end surface of the slot 503 formed in the side plate 510a, thereby determining the measurement positions of the feeler arms 514 and 516. The rotation of the feeler arms 514 and 516 up to this measurement positions is detected as the position of a sensor plate 525 attached to the large gear 521 is detected by a sensor 524 attached to the side plate 510a, as shown in FIG. 15.

Figure 17A:
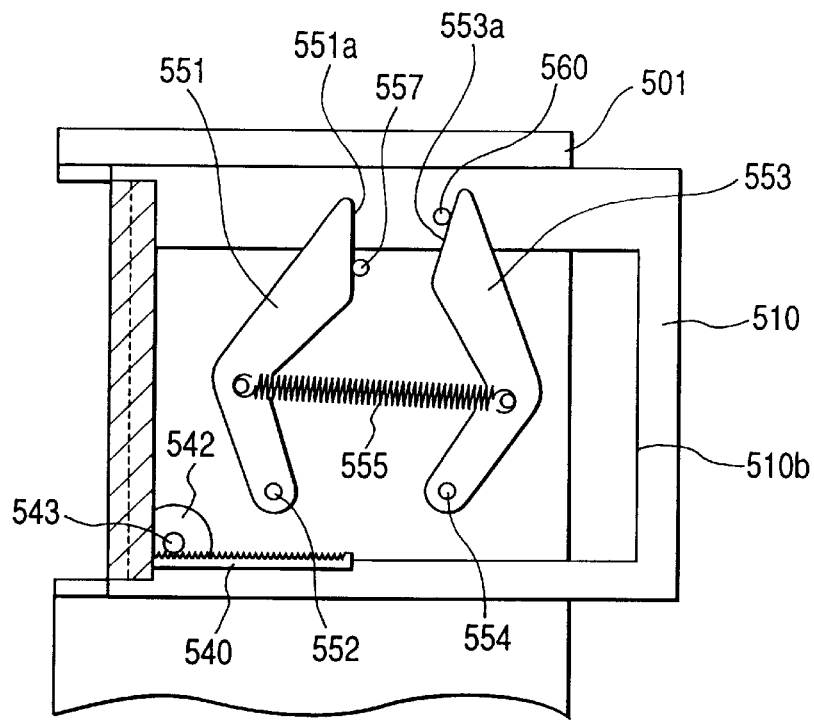
FIG. 17 is a diagram explaining the state of left-and-right movement of the lens-shape measuring section.
Figure 17B:
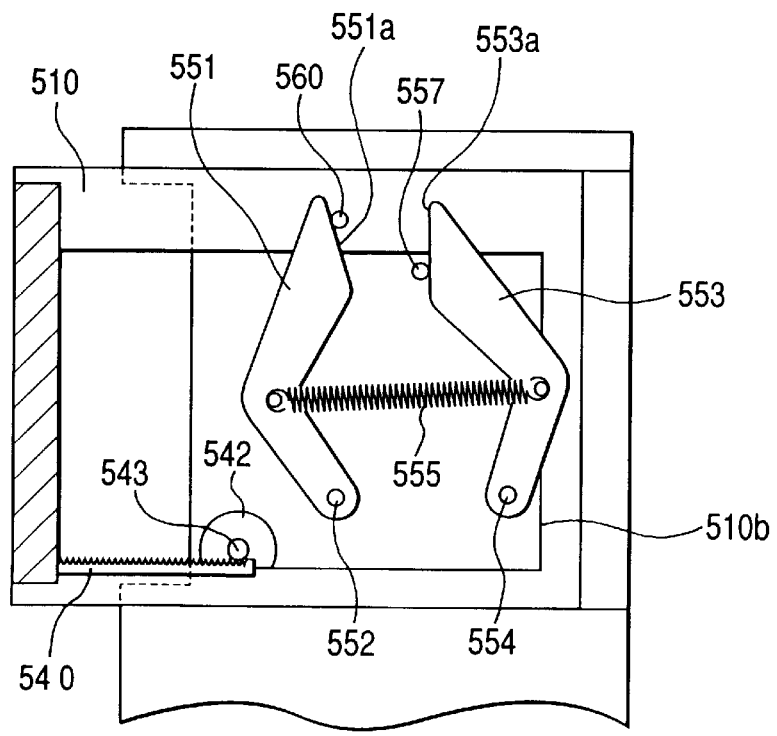

Referring to FIGS. 16 and 17, a description will be given of a left-and-right moving mechanism of the sliding base 510 (feeler arms 514, 515). FIG. 17 is a diagram illustrating the state of left-and-right movement.

An opening 510b is formed in the sliding base 510, and a rack 540 is provided at a lower end of the opening 510b. The rack 540 meshes with a pinion 543 of an encoder 542 fixed to the supporting block 501, and the encoder 542 detects the direction of the left-and-right movement and the amount of movement of the sliding base 510. A chevron-shaped driving plate 551 and an inverse chevron-shaped driving plate 553 are attached to a wall surface of the supporting block 501, which is exposed through the opening 510b in the sliding base 510, in such a manner as to be rotatable about a shaft 552 and a shaft 554, respectively. A spring 555 having urging forces in the directions in which the driving plate 551 and the driving plate 553 approach each other is stretched between the two driving plates 551 and 553. Further, a limiting pin 557 is embedded in the wall surface of the supporting block 501, and when an external force is not acting upon the sliding base 510, both an upper end face 551a of the driving plate 551 and an upper end face 553a of the driving plate 553 are in a state of abutting against the limiting pin 557, and this limiting pin 557 serves as an origin of the left- and rightward movement.

Meanwhile, a guide pin 560 is secured to an upper portion of the sliding base 510 at a position between the upper end face 551a of the driving plate 551 and the upper end face 553a of the driving plate 553. When a rightwardly moving force acts upon the sliding base 510, as shown in FIG. 17 (a), the guide pin 560 abuts against the upper end face 553a of the driving plate 553, causing the driving plate 553 to be tilted rightward. At this time, since the driving plate 551 is fixed by the limiting pin 557, the sliding base 510 is urged in the direction of being returned to the origin of left- and rightward movement (in the leftward direction) by the spring 555. On the other hand, when a leftwardly moving force acts upon the sliding base 510, as shown in FIG. 17 (b), the guide pin 560 abuts against the upper end face 551a of the driving plate 551, and the driving plate 551 is tilted leftward, but the driving plate 553 is fixed by the limiting pin 557. Accordingly, the sliding base 510 this time is urged in the direction of being returned to the origin of left- and rightward movement (in the rightward direction) by the spring 555. From such movement of the sliding base 510, the amount of movement of the feeler 515 in contact with the lens rear surface and the feeler 517 in contact with the lens front surface (the amount of axial movement of the chuck shafts) is detectedby a single encoder 542.

It should be noted that, in FIG. 13, reference numeral 50 denotes a waterproof cover, and only the shaft 511, the feeler arms 514 and 516, and the feelers 515 and 517 are exposed in the waterproof cover 50. Numeral 51 denotes a sealant for sealing the gap between the waterproof cover 50 and the shaft 511. Although a coolant is jetted out from an unillustrated nozzle during processing, since the lens-shape measuring section 500 is disposed in the rear of the processing chamber and by virtue of the above-described arrangement, it is possible to provide waterproofing for the electrical components and moving mechanism of the lens-shape measuring section 500 by merely providing shielding for the shaft 511 exposed in the waterproof cover 50, and the waterproofing structure is thus simplified.

Figure 18:
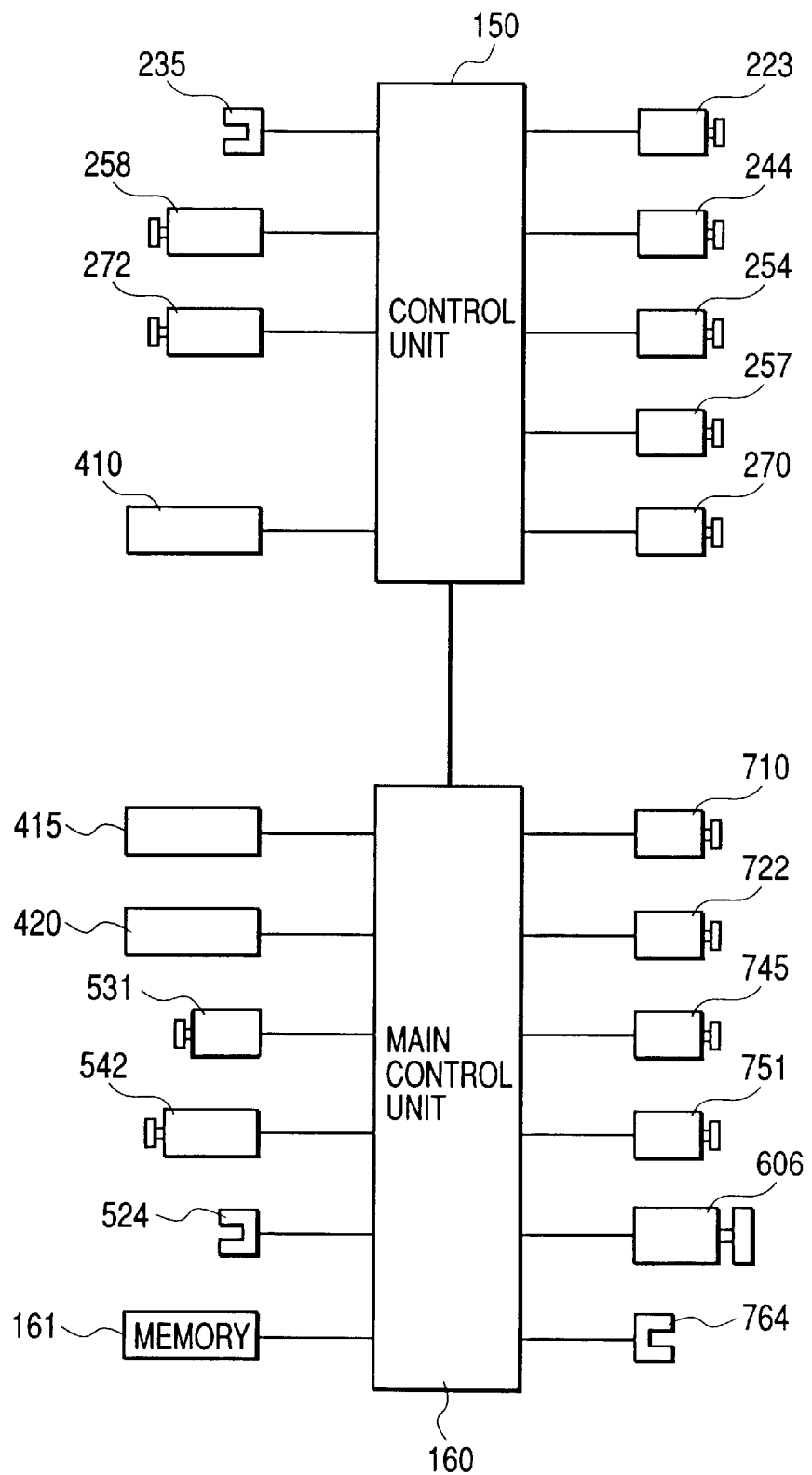
FIG. 18 is a block diagram of a control system of the apparatus.

Next, referring to the control system block diagram shown in FIG. 18, a description will be given of the operation of the apparatus having the above-described construction.

Prior to processing by the apparatus, the measurement of the shape of the lens frame by the frame-shape measuring device 2 is effected. First, a description will be given of the measurement of the frame F. Although the frame holding section 200 of the frame-shape measuring device 2 is capable of holding both frame portions of the frame F and holding a single frame portion, a description will be given herein of the case where both frame portions are held.

The front slider 202 is pulled toward the front side (the operator side) to widen the distance between the front slider 202 and the rear slider 203. An upper portion of the frame F is placed between the clamp pins 231Ra and 231Rb and between the clamp pins 231La and 231Lb, while a lower portion of the frame F is placed between the clamp pins 230Ra and 230Rb and between the clamp pins 230La and 230Lb. Since centripetal forces for moving toward the reference line L1 are constantly acting in the front slider 202 and the rear slider 203 owing to the spring 213, the distance between the two sliders 202 and 203 is thereby narrowed, and the frame F is held with the reference line L1 as the center. At this time, since the holding surface of the frame holding section 200 is disposed in such a manner as to be inclined forward along the upper surface of the main body 1, the setting of the frame F is facilitated.

Upon completion of the setting of the frame F, a both-eye tracing switch 412 of the switch panel section 410 is pressed. Then, a control unit 150 on the frame-shape measuring device 2 drives the motor 223, and as the shaft 220 is rotated, the clamp pins at four locations are closed to fix the frame F. Upon completion of the fixation of the frame F, the measuring section 240 is operated to measure the shape of the lens frame of the frame F. In the case of both-eye tracing, the control unit 150 moves the transversely movable base 241 in advance by driving the motor 244 so that the feeler 280 is located at a predetermined position on the right frame portion of the frame F. In addition, by driving the motor 254, the rotating base 250 is rotated in advance to effect initialization so that a tip of the feeler 280 faces the clamp pins 230Ra, 230Rb side. Subsequently, the vertically supporting base 265 is raised by driving the motor 270 to allow the feeler 280 to be located at the height of the measurement reference plane (in this embodiment, the measurement reference plane is also tilted forward). The amount of movement at the time the feeler 280 is raised from a lowest-point position can be obtained from the detection by the encoder 272, and the control unit 150 causes the feeler 280 to be located at the height of the measurement reference plane on the basis of the detection information of the encoder 272.

Subsequently, the control unit 150 drives the motor 257 to move the movable base 260, and thereby allows the tip of the feeler 280 to be inserted in the frame groove of the frame F. During this movement, since a DC motor is used as the motor 257, the driving current (driving torque) to the motor 257 can be controlled to provide a predetermined driving force. Therefore, it is possible to impart a weak pressing force of such a degree that the frame is not deformed and that the feeler 280 is not dislocated. Subsequently, the pulse motor 254 is rotated in accordance with each predetermined unit number of rotational pulses to rotate the feeler unit 255 together with the rotating base 250. As a result of this rotation, the movable base 260 together with the feeler 280 moves along the direction of the rail of the guide rail receiver 256*a* in accordance with the radius vector of the frame groove, and the amount of its movement is detected by the encoder 258. Further, the vertically supporting base 265 together with the feeler 280 moves vertically along the warp (curve) of the frame groove, and the amount of its movement is detected by the encoder 272. From the angle of rotation θ of the pulse motor 254, the amount r detected by the encoder 258, and the amount z detected by the encoder 272, the lens frame shape is measured as (rn, θn, zn) (n=1, 2, . . . , N)

During measurement while rotating the feeler unit 255, the control unit 150 controls the driving of the motor 257 on the basis of the inclination of the measurement reference plane and information on the change of the radius vector detected. Namely, since the measurement reference plane is inclined, the driving of the motor 257 is changed to cancel a load on the feeler unit 255 at each angle of rotation of the feeler unit 255, thereby making constant the pressing force of the feeler 280 to the frame groove. As for the amount of change of the driving current at each angle of rotation, for example, data on such a driving current for the motor 257 that the position of the feeler 280 does not change is obtained in advance for each unit angle of rotation. Further, a reference driving current for applying a predetermined pressing force to the frame groove by the feeler 280 is determined in advance by using as a reference the angle at which the feeler unit 255 moves horizontally (the angle at which the load of the feeler unit 255 is canceled). Then, from the relationship between the two, it is possible to obtain data on the change of the driving current at each rotational angle which takes the inclination into consideration. For instance, the driving current is changed with the ratio of the driving current data at each angle to the reference driving current.

Further, the control unit 150 changes the driving current for the motor 257 in correspondence with the change of the radius vector of the frame groove so that the feeler 280 will not be dislocated during measurement and/or the deformation of the frame will be suppressed. First, the control unit 150 estimates a change of the radius vector of an unmeasured portion from the already-measured radius vector data (rn, θn) (n=1, 2, . . . ). For example, an inclination of the change of the radius vector at a present measurement point is determined from the already-measured radius vector data measured at each predetermined angle α of radius vector (e.g., 3 to 5 degrees). This can be obtained by subjecting data between positions at the angle α of radius vector to differentiation processing or averaging processing. The change of the radius vector of the unmeasured portion is estimated by assuming that the measurement point at an ensuing angle α of radius vector of the unmeasured portion is located on an extension of the inclination of the change of the radius vector thus determined. Then, if it is estimated that the radius vector changes in the direction in which the length of the radius vector of the unmeasured portion becomes longer, the driving torque of the motor 257 is increased relative to the driving torque persisting at the immediately preceding angle α of radius vector. The amount of change of the driving torque (driving current) may be obtained in correspondence with the degree of inclination of the change of radius vector, or may be obtained so as to increase the driving torque by a predetermined amount each time the inclination of the change of radius vector exceeds a certain range. Consequently, the moving speed of the feeler 280 is accelerated in the direction in which the length of the radius vector becomes longer, thereby making it possible to prevent the dislocation of the feeler 280 from the frame groove during measurement.

On the other hand, if it is estimated that the radius vector changes in the direction in which the length of the radius vector of the unmeasured portion becomes shorter, the driving torque of the motor 257 is weakened relative to the driving torque persisting at the immediately preceding angle α of radius vector. The amount of change of the driving torque may be also determined in correspondence with the degree of inclination of the change of radius vector, or may be determined so as to weaken the driving torque by a predetermined amount each time the inclination of the change of radius vector exceeds a certain range. Consequently, it is possible to suppress the increase in the pressing force of the feeler 280 applied to the frame groove, thereby making it possible to prevent the deformation of the frame. It should be noted that since the radius vector of the frame gradually changes, if the driving torque of the motor 257 is gradually weakened, and if the driving torque ultimately becomes zero, it is possible to avoid an excess pressing force with respect to the change in the direction in which the length of the radius vector becomes shorter. Further, if it is estimated that the change takes place in the direction in which the length of the radius vector abruptly becomes short, the load of the pressing force with respect to the frame groove may be reduced by reversely rotating the motor 257.

In addition, the control of the drive of the motor 257 in the course of measurement may be effected as follows. For instance, in the estimation of the change of the radius vector of the unmeasured portion by the control unit 150, after the inclination of the change of the radius vector of the measurement point is obtained as being the normal direction from the already-measured data, estimation is made by assuming that an ensuing measurement point is located on an extension of this normal direction. The measured data may not be data on all the angles, but maybe data on a certain immediately preceding angular portion.

Further, since an inflection point at which the length of the radius vector shifts from one of an increase and a decrease to the other can be obtained from the radius vector data which are consecutively obtained (it is more preferable to see data of a certain range), control may be provided such that upon detection of the shift of the length of the radius vector to an increase, the driving torque of the motor 257 is increased, whereas upon detection of the shift of the length of the radius vector to a decrease, the driving torque of the motor 257 is weakened. When the length of the radius vector shifts to a decrease, a pressing force from the feeler 280 strongly acts upon the frame groove, weakening the driving torque in the above-described manner will suppress the deformation of the frame as well as the offset of the frame held in the frame holding section 200.

In addition, in terms of the structure of the frame, deformation is most likely to take place in the range from the lower side of the frame (i.e., the lower side of the frame in the worn state) to a bridge connecting both frame portions. This range is the portion where the feeler 280 is liable to be dislocated (generally, the radius vector changes gradually). Accordingly, control may be provided such that the driving torque of the motor for the angular portion of this range is made sufficiently weaker than other measurement portions (the angular portion of this range may be set in advance or may be estimated from the data being measured). In this way, control of the driving of the motor 257 in the course of measurement can be effected by various methods.

In addition to the control of the driving of the motor 257, the control unit 150 also controls the driving of the motor 270 for vertically moving the feeler 280 on the basis of the information on the change of the warp (vertical displacement) of the frame groove detected. In the same way as the method of control corresponding to the change of the radius vector information, the control unit 150 determines the inclination of the vertical change at the present measurement point from the already-measured vertical movement data (θn, zn) (n=1, 2, ... ), and estimates a change of the unmeasured portion by assuming that an ensuing measurement point is also located on the extension of the inclination of the vertical change. The driving current of the motor 270 is changed in correspondence with that change. When it is estimated that the frame groove changes in the upward direction, the feeler 280 is raised so as to follow that degree of change. When it is estimated that the frame groove changes in the downward direction, the feeler 280 is lowered so as to follow that degree of change. The feeler 280 may be moved by a predetermined amount when the vertical change is estimated to exceed a certain value.

By virtue of the above-described control of the driving of the motors 257 and 270, it is possible to prevent the dislocation of the feeler 280 from the frame groove during measurement, and suppress the deformation of the frame. Upon completion of the measurement of the right frame portion of the frame F, measurement is performed for the left frame portion in a similar manner.

A description will be given of the case where the shape of the template or the dummy lens is measured. The template or the dummy lens is mounted on the template holding portion 320 or the cup holding portion 330 of the template holder 310 in the above-described procedure. In the case of the dummy lens as well, it can be simply mounted on the template holder 310 by a simple operation of the button 314 without preparing a special fixing part.

After completion of the mounting on the template holder 310, the front slider 202 is pulled all the way toward the front side (the operator side) to fix the template holder 310 on the upper surface of the attaching plate 300. Since the flange 344 (348) of the template holder 310 is engaged with the recessed surface 202a of the front slider 202, the open state of the front slider 202 and the rear slider 203 is secured. The open state of the front slider 202 is detected by the sensor 235, and it is detected that the mode is the template measurement mode.

After the setting of the template holder 310, if the template (or dummy lens) to be measured is for the right eye, a right trace switch 413 on the switch panel section 410 is pressed, whereas if the template (or dummy lens) is for the left eye, a left trace switch 411 is pressed. Incidentally, in the case of measurement using the template holder 310, the top of the measuring shaft 290 is pressed beforehand to keep the measuring shaft 290 raised.

The control unit 150 drives the motor 244 to cause the measuring section 240 to be located at the central measuring position. Subsequently, the control unit 150 moves the movable base 260 by driving the motor 257 such that the measuring shaft 290 moves toward the central side. In the state in which the measuring shaft 290 abuts against the end face (edge) of the template (or dummy lens), the pulse motor 254 is rotated at each predetermined unit number of rotational pulses, and the feeler unit 255 is rotated. The measuring shaft 290 moves in accordance with the radius vector of the template, and the amount of its movement is detected by the encoder 258, so that the target shape of the lens is measured.

Upon obtaining the target lens shape by the frame shape measurement or the template shape measurement, the operator presses a data switch 421 on the switch panel section 420, whereby the target lens shape data is transferred to a data memory 161, and the target lens shape is graphically displayed on a display 415. By operating switches for data input arranged on the switch panel section 420, the operator enters layout data such as the PD value of the wearer and positional data on the optical center height. Further, the operator enters data on the processing conditions such as the material of the frame, lens material, and the like.

Upon completion of the entry of the data, the operator mounts the basal part of a cup (i.e., a fixing jig fixed to the lens LE) on the cup holder of the chuck shaft 702L, and then presses a chuck switch 422 on the switch panel section 420 to drive the motor 710, which in turn moves the chuck shaft 702R to chuck the lens LE. Even in cases where the lens LE needs to be held so as not to come off the chuck shaft 702L at the time of this chucking, since the chuck switch 422 is disposed in the vicinity of the center in the left-and-right direction on the front side of the processing window 402 (in the vicinity of the position for chucking the lens LE), the operator, while holding the lens LE with his or her easy-to-hold hand, can easily operate the chuck switch 422 with the other hand.

After completion of lens chucking, the operator presses a start switch 423 to start the apparatus. A main control unit 160 first executes the lens shape measurement by using the lens-shape measuring section 500 in accordance with a processing sequence program. The main control unit 160 drives the motor 531 to rotate the shaft 511, causing the feeler arms 514 and 516 to be positioned to the measuring position from the retreated position. On the basis of the processing shape data calculated from the inputted target lens shape data and layout data, the main control unit 160 vertically moves the carriage 701 so as to change the distance between the axis of the chuck shafts and the axis Lb connecting the feeler 515 and the feeler 517, and causes the chucked lens LE to be located between the feeler 515 and the feeler 517, as shown in FIG. 13. Subsequently, the carriage 701 is moved by a predetermined amount toward the feeler 517 side by driving the motor 745 so as to cause the feeler 517 to abut against the front-side refracting surface of the lens LE. The initial measuring position of the lens LE on the feeler 517 side is at a substantially intermediate position in the leftward moving range of the sliding base 510, and a force is constantly applied to the feeler 517 by the spring 555 such that the feeler 517 abuts against the front-side refracting surface of the lens LE.

In the state in which the feeler 517 abuts against the front-side refracting surface, the lens LE is rotated by the motor 722, and the carriage 701 is vertically moved by driving the motor 751 on the basis of the processing shape data (the distance between the axis of the chuck shafts 702L and 702R and the axis Lb is changed). In conjunction with such rotation and movement of the lens LE, the feeler 517 moves in the left-and-right direction along the shape of the lens front surface. The amount of this movement is detected by the encoder 542, and the shape of the front-side refracting surface of the lens LE (the path of the front-side edge position) is measured.

Upon completion of the front side of the lens, the main control unit 160 rightwardly moves the carriage 701 as it is, and causes the feeler 515 to abut against the rear-side refracting surface of the lens LE to change over the measuring surface. The initial measuring position of rear-side measurement is similarly at a substantially intermediate position in the rightward moving range of the sliding base 510, and a force is constantly applied to the feeler 515 such that the feeler 515 abuts against the rear-side refracting surface of the lens LE. Subsequently, while causing the lens LE to undergo one revolution, the shape of the rear-side refracting surface (the path of the rear-side edge position) is measured from the amount of movement of the feeler 515 in the same way as in the measurement of the front-side refracting surface. When the shape of the front-side refracting surface and the shape of the rear-side refracting surface of the lens can be obtained, edge thickness information can be obtained from the two items of the information. After completion of the lens shape measurement, the main control unit 160 drives the motor 531 to retreat the feeler arms 514 and 516.

The lens-shape measuring section 500 of this apparatus has the function of measuring the outside diameter of the lens, and when this measurement is effected, the following procedure is taken. The main control unit 160 drives the motor 745 to move the carriage 701 until the edge surface of the lens LE reaches a side surface portion of the feeler 517. Subsequently, on the basis of the processing shape data (diameter data), the lens LE is rotated and the motor 751 is driven to vertically move the carriage 701, to thereby change the distance between the axis of the chuck shafts 702L and 702R and the axis Lb. During such vertical movement of the carriage 701, in a case where the lens outside diameter satisfies the target lens shape, the side surface of the feeler 515 abuts against the edge surface of the lens LE, and the feeler arm 514 is lifted up, so that the sensor 524 detects the same. In a case where the lens outside diameter is insufficient with respect to the target lens shape, the side surface of the feeler 515 does not abut against the edge surface of the lens LE. Hence, the feeler arm 514 remains positioned at the lowest point, and the sensor 524 detects the sensor plate 525, thereby detecting the insufficiency of the lens diameter. By rotating the lens LE by one revolution in this manner, it is possible to detect the insufficiency of the lens diameter over the entire periphery of the lens LE.

When information on the insufficiency of the lens outside diameter with respect to the target lens shape has been obtained, the insufficient portion is made to flash in the graphic display of the target lens shape being displayed on the display 415, thereby making it possible to notify the operator of the insufficient portion.

It should be noted that the measurement of the lens outside diameter over the entire periphery may be effected as part of the processing sequence program, but only the measurement of the lens outside diameter may be effected singly by pressing the switch 425.

Upon completion of the measurement of the lens shape, the processing of the lens LE is executed in accordance with the input data of the processing conditions. For example, in a case where the lens LE is a plastic, the main control unit 160 moves the carriage 701 by means of the motor 745 so that the lens LE is brought over the rough abrasive wheel 602b, and vertically moves the carriage 701 on the basis of the processing shape data to perform processing. In the case of performing beveling, the main control unit 160 controls the movement of the carriage 701 on the basis of the beveling data obtained from the lens shape data, and allows beveling finish processing to be effected by the finish abrasive wheel 602c. The beveling data is calculated by the main control unit 160 on the basis of the lens shape data and the target lens shape data.

According to the present invention, it is possible to speedily effect the fixation of the template or the dummy lens to the template holder without trouble. Further, the mounting of the template holder on the lens-shape measuring apparatus can be performed easily.

What is claimed is:

1. A template holder that is used in measurement of a target shape of an eyeglass lens and that attaches at least one of a template and a dummy lens thereon, the holder comprising:
   a template attaching portion including:
      a template placement portion, on which positioning pins to be inserted into small holes of the template are disposed, for placing the template along a measurement plane;
      a support shaft to be inserted into a central hole of the template, the support shaft being movable relative to the template placement portion to slide the template on and along the measurement plane;
      urging means for urging the support shaft to be moved in an urging direction; and
      moving means for moving the support shaft in a direction opposite from the urging direction against a urging force of the urging means when the template is to be attached or detached; and
   a holding arm holding the template attaching portion.

2. The template holder according to claim 1, further comprising:
   a dummy lens attaching portion including:
      a fixing cup supporting portion having an insertion hole into which a basal end of a fixing cup fixing the dummy lens thereon is to be inserted; and
      a pressing member having a contact surface to be contacted with the basal end of the fixing cup,
   wherein the holding arm holds the dummy lens mounting portion.

3. The template holder according to claim 2, wherein the urging means urges the support shaft and the pressing member to move the support shaft and the pressing member in synchronization with each other in the urging direction, and the moving means moves the support shaft and the pressing member in synchronization with each other in the direction opposite from the urging direction against the urging force of the urging means when at least one of the template and the fixing cup is to be attached or detached.

4. A target lens shape measuring device for measuring a target shape of an eyeglass lens, comprising:
   the template holder of claim 1; and
   fixing means for attaching and fixing a part of the template holder thereon.

5. The device according to claim 4, further comprising:
   a measurement pin movable while being kept in contact with an outer periphery of the template attached to the template holder fixed by the fixing means;
   measuring means for measuring information on radius vector of the template based on an amount of movement of the measurement pin.

6. An eyeglass lens processing apparatus, provided with the target lens shape measuring device of claim 5, for processing an eyeglass lens based on obtained information on radius vector, the apparatus comprising:
   lens processing means having a rotatable abrasive wheel, and a lens rotating shaft for holding and rotating the lens; and
   control means for controlling the lens processing means based on the obtained information of the radius vector.

7. A template holder that is used in measurement of a target shape of an eyeglass lens and that attaches at least one of a template and a dummy lens thereon, the holder comprising:

a dummy lens attaching portion including:
- a fixing cup supporting portion having an insertion hole into which a basal end of a fixing cup fixing the dummy lens thereon is to be inserted; and
- a pressing member having a contact surface to be contacted with the basal end of the fixing cup;
- urging means for urging the pressing member to be moved in an urging direction; and
- moving means for moving the pressing member in a direction opposite from the urging direction against a urging force of the urging means when the dummy lens is to be attached or detached; and
- a holding arm holing the dummy lens attaching portion.

8. A target lens shape measuring device for measuring a target shape of an eyeglass lens, comprising:
- the template holder of claim 7; and
- fixing means for attaching and fixing a part of the template holder thereon.

9. The device according to claim 8, further comprising:
- a measurement pin movable while being kept in contact with an outer periphery of the dummy lens attached to the template holder fixed by the fixing means;
- measuring means for measuring information on radius vector of the dummy lens based on an amount of movement of the measurement pin.

10. An eyeglass lens processing apparatus, provided with the target lens shape measuring device of claim 9, for processing an eyeglass lens based on obtained information on radius vector, the apparatus comprising:
- lens processing means having a rotatable abrasive wheel, and a lens rotating shaft for holding and rotating the lens; and
- control means for controlling the lens processing means based on the obtained information of the radius vector.

11. A target lens shape measuring device for measuring a target shape of an eyeglass lens, the device comprising:
- a template attaching portion including:
  - a template placement portion, on which positioning pins to be inserted into small holes of the template are disposed, for placing the template along a measurement plane;
  - a support shaft to be inserted into a central hole of the template, the support shaft being movable relative to the template placement portion to slide the template on and along the measurement plane;
  - urging means for urging the support shaft to be moved in an urging direction; and
  - moving means for moving the support shaft in a direction opposite from the urging direction against a urging force of the urging means when the template is to be attached or detached; and
- a holding arm holding the template attaching portion.

12. The device according to claim 11, further comprising:
- a dummy lens attaching portion including:
  - a fixing cup supporting portion having an insertion hole into which a basal end of a fixing cup fixing the dummy lens thereon is to be inserted; and
  - a pressing member having a contact surface to be contacted with the basal end of the fixing cup,
- wherein the holding arm holds the dummy lens mounting portion.

13. The device according to claim 12, wherein the urging means urges the support shaft and the pressing member to move the support shaft and the pressing member in synchronization with each other in the urging direction, and the moving means moves the support shaft and the pressing member in synchronization with each other in the direction opposite from the urging direction against the urging force of the urging means when at least one of the template and the fixing cup is to be attached or detached.

14. A target lens shape measuring device for measuring a target shape of an eyeglass lens, the device comprising:
- a dummy lens attaching portion including:
  - a fixing cup supporting portion having an insertion hole into which a basal end of a fixing cup fixing the dummy lens thereon is to be inserted; and
  - a pressing member having a contact surface to be contacted with the basal end of the fixing cup;
  - urging means for urging the pressing member to be moved in an urging direction; and
  - moving means for moving the pressing member in a direction opposite from the urging direction against a urging force of the urging means when the dummy lens is to be attached or detached; and
- a holding arm holing the dummy lens attaching portion.

* * * * *